(12) United States Patent
Dreher

(10) Patent No.: US 11,527,945 B2
(45) Date of Patent: Dec. 13, 2022

(54) RING ARRANGING DEVICE

(71) Applicant: Clemens Dreher, Munich (DE)

(72) Inventor: Clemens Dreher, Munich (DE)

( * ) Notice: Subject to any disclaimer, the term of this patent is extended or adjusted under 35 U.S.C. 154(b) by 53 days.

(21) Appl. No.: 16/938,698

(22) Filed: Jul. 24, 2020

(65) Prior Publication Data

US 2021/0028676 A1 Jan. 28, 2021

(30) Foreign Application Priority Data

Jul. 26, 2019 (DE) ...................... 10 2019 120 262.0

(51) Int. Cl.
*H02K 15/04* (2006.01)

(52) U.S. Cl.
CPC ................................ *H02K 15/0421* (2013.01)

(58) Field of Classification Search
CPC .................................................. H02K 15/0421
See application file for complete search history.

(56) References Cited

U.S. PATENT DOCUMENTS

| | | | | |
|---|---|---|---|---|
| 2010/0289374 A1* | 11/2010 | Koga | ................ | H02K 15/0421 310/195 |
| 2018/0233995 A1* | 8/2018 | Okuda | ................. | H01R 43/205 |
| 2018/0233999 A1* | 8/2018 | Ponzio | .............. | H02K 15/0428 |
| 2019/0190359 A1* | 6/2019 | Miyawaki | ................ | H02K 3/12 |

FOREIGN PATENT DOCUMENTS

| | | | | |
|---|---|---|---|---|
| DE | 102016111478 A1 | 6/2017 | | |
| DE | 102016219480 A1 | 4/2018 | | |
| EP | 3664264 A1 | 6/2020 | | |
| GB | 644761 A | 10/1950 | | |
| WO | WO-2013153594 A1 * | 10/2013 | ......... | H02K 15/0428 |
| WO | 2018233769 A1 | 12/2018 | | |
| WO | 2018233771 A1 | 12/2018 | | |
| WO | 2018233774 A1 | 12/2018 | | |
| WO | WO-2019084587 A1 * | 5/2019 | ........... | B21D 39/046 |

* cited by examiner

*Primary Examiner* — Peter Dungba Vo
*Assistant Examiner* — Jose K Abraham
(74) *Attorney, Agent, or Firm* — Albert Bordas, P.A.

(57) ABSTRACT

In the formation of coil windings of an electrical machine, the invention provides a ring arrangement device for forming a ring arrangement from a plurality of concentrically arranged rings of electrical conductors to form a coil winding of a component of an electrical machine, comprising a collecting receptacle with a plurality of grooves arranged in a ring around an axis and delimited by radial webs and a ring positioning device for the relative axial positioning of one or more of the rings, wherein the ring positioning device has a support device for supporting the electrical conductors of one of the rings to be inserted in an axial insertion position and one holding device for holding the conductors in a storage position, in which the conductors of a completely inserted ring are moved further into the collecting receptacle.

6 Claims, 17 Drawing Sheets

RING ARRANGING DEVICE

Figure 1:
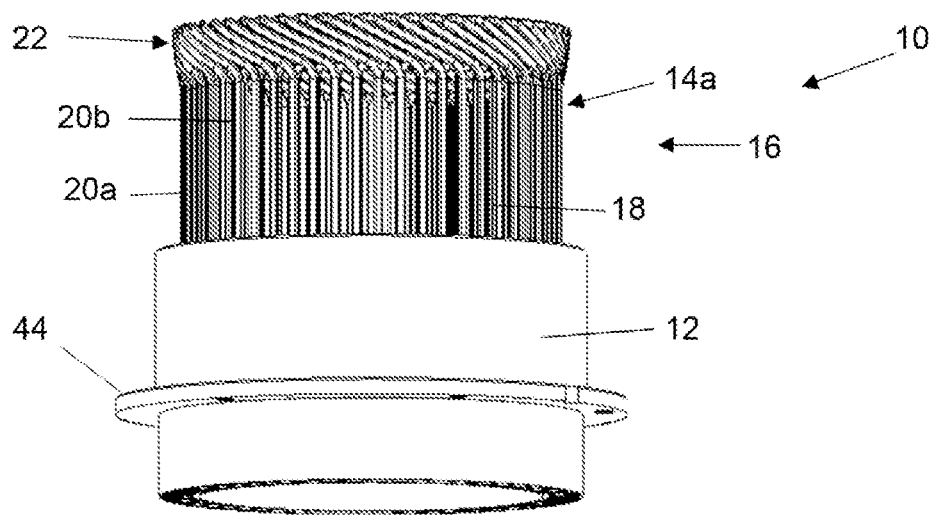

The invention relates to a ring arrangement device and a ring arrangement method for forming a ring arrangement from a plurality of concentrically arranged rings of preferably U-shaped electrical conductors in order to form a coil winding of a component of an electrical machine.

The invention is in the field of manufacturing components of electrical machines, such as in particular motors and generators, and more particularly in the field of manufacturing coil windings for such a component, such as a stator. It is known to form such coil windings from individual conductors, for example I-pins or hairpins, which are inserted into grooves in a housing of the component, the ends of the conductor being deformed and then connected to form coil windings. For the insertion of the conductors, it is known from

[1] WO 2018/233771 A1,
[2] WO 2018/233774 A1 and
[3] WO 2018/233769 A1 to first arrange the conductors into a ring and then insert the ring into the housing.

According to [1] to [3], the individual pins are gripped individually and then inserted into a pre-insertion nest to form a ring. A ring-specific nest is provided for each ring of a stator. An exemplary pre-insertion nest is shown in [3], FIG. 1 and consists of grooves, the dimensions of which are larger than the space the respective ring takes up in the stator. After each ring has been inserted into a specially designed pre-insertion nest, the rings are lifted out of the respective pre-insertion nest with the joining device described and shown in more detail in [1] and combined in a collecting receptacle in the form of a collecting nest. If, for example, a ring arrangement is to be formed from a first to a third ring, one can start with the outer ring, then the central ring is transferred, then the inner ring. The collecting nest known from [1] and [2] is similar to the pre-insertion nest—see [1]—only that its outer and inner diameters are designed so that all rings can be accommodated in it and not just a specific one (as is the case in the pre-insertion nest)—it is dimensioned so that the grooves of the collecting nest in the tangential as well as the radial direction are larger than all the space the rings together require in the stator. If the outer, middle and inner ring are successively combined with the joining device in the collecting nest, all rings are lifted out of the collecting nest together with the joining device and then joined into the stator using the joining device.

Accordingly, in the prior art, according to references [1] and [2], a ring arrangement and joining process is carried out with the following steps:

1.1. Inserting the individual pins to the outer ring in an (outer ring) pre-insertion nest;
1.2. Lifting the outer ring out of the (outer ring) pre-insertion nest with joining device;
1.3. Joining the outer ring in the collecting nest with joining device;
2. Analogous procedure with central ring;
3. Analogous procedure with inner ring.
All rings are then in the collecting nest.
4. Lifting all rings out of collecting nest with joining device;
5. Fitting all rings in the stator with joining device.

The methods and devices known from [1] to [3] have proven themselves; high quality coil windings can be effectively manufactured.

The invention has set itself the task of improving the devices and methods known from [1] to [3] with regard to lower expenditure on apparatus and process technology.

To achieve this object, the invention provides a ring arrangement device and a ring arrangement method according to the independent claims.

Advantageous refinements are the subject of the dependent claims.

According to one aspect, the invention provides a ring arrangement device for forming a ring arrangement from a plurality of concentrically arranged rings of preferably U-shaped electrical conductors in order to form a coil winding of a component of an electrical machine, comprising a collecting receptacle with a plurality of grooves arranged in a ring around an axis and delimited by radial webs and a ring positioning device for the relative axial positioning of one or more of the rings, wherein the ring positioning device has a support device for supporting the electrical conductors of a ring to be inserted in an axial plug-in position in which the conductors protrude further from the collecting receptacle, and a holding device for holding the conductors of a completely inserted ring in a storage position in which the conductors of the finished ring are moved further into the collecting receptacle, and is designed to support the conductors of a second ring to be inserted with the support device, while the holding device holds the conductors of a fully inserted first ring in the storage position.

With the device and the method according to exemplary embodiments of the invention, in particular U-shaped electrical conductors (hairpins) can be arranged to form a ring. The device and method according to exemplary embodiments of the invention can alternatively also be used for single-leg conductors without a U-bend (I-pins, i.e., one-leg pins).

The grooves of the collecting receptacle each have a circumferentially extending groove boundary on a first radial side and each have an opening on a second radial side.

The ring positioning device has radially or axially movable ring positioning slides engaging in the opening, on which the support device and/or the holding device are formed.

It is preferred that the groove limitation is formed on the webs and/or on an annular region of the collecting receptacle.

It is preferred that the support device has stops for the conductors formed on an end face of the individual ring positioning slides extending transversely to the axis.

It is preferred that the holding device has a lateral surface that can be moved against the groove boundary on the individual ring positioning slides, so that the conductors can be positioned between the lateral surface and the groove boundary.

The ring positioning slides are preferably movable in such a way that the conductors can be clamped between the lateral surface and the groove boundary. However, it does not necessarily have to be clamped; positioning with lower, i.e., non-clamping forces (i.e., no frictional connection) or with little play would in principle also be possible.

In a currently preferred embodiment it is provided that the openings of the grooves are formed on an inner radial side and that a ring positioning slide movement device for radially and/or axially moving the ring positioning slide can be arranged radially within the collecting receptacle. The entire arrangement can also be mirrored, that is to say the openings of the grooves are then formed on an outer radial side and the ring positioning slide movement device can be arranged radially outside the collecting receptacle. For example, grooves would then be arranged on the inside, and slides on the outside press the wires into the grooves arranged on the inside.

It is preferred that the storage position is a stop position at which the preferably U-shaped conductors with their U-shaped end strike the collecting receptacle and can thus be positioned. The same also works with I-pins if they have a kink.

A preferred ring arrangement device has a gripping device for gripping and inserting the conductors into a ring and a controller for controlling the ring positioning device and the gripping device.

It is preferred that the controller is designed to control the gripping device and the ring positioning device for:

inserting electrical conductors into the grooves of the collecting receptacle at the axial insertion position, at which the conductors protrude axially from the collecting receptacle to form a first ring, axially moving the first ring from the axial insertion position further into the collecting receptacle into the storage position, inserting electrical conductors into the grooves of the collecting receptacle at the axial insertion position to form a second ring while the first ring is held at the storage position, and axial displacement of the second ring into the storage position.

According to a further aspect, the invention provides a ring arrangement method for forming a ring arrangement comprising a plurality of concentrically arranged rings of preferably U-shaped electrical conductors, in order to form a coil winding of a component of an electrical machine, comprising a) inserting electrical conductors into grooves of a collecting receptacle arranged in a ring around an axis and delimited by radial webs, at an axial insertion position at which the conductors protrude axially from the collecting receptacle to form a first ring, b) axially moving the first ring from the axial insertion position further into the collecting receptacle into a storage position, c) inserting electrical conductors into the grooves of the collecting receptacle at the axial insertion position to form a second ring while the first ring is held at the storage position, and d) axial displacement of the second ring into the storage position.

A preferred embodiment of the ring arrangement method comprises the steps:

e) Inserting electrical conductors into the grooves of the collecting receptacle at the insertion position to form a third ring while the first and second rings are held at the storage position, and f) axial displacement of the third ring into the storage position.

It is preferred that an outer ring is inserted as the first ring and the second ring is inserted further radially inwards than the first ring.

It is preferred that a middle ring is inserted as the second ring.

It is preferred that an inner ring is inserted as the third ring.

It is preferred that the conductors are supported by movable stops when inserted, so that they remain in the insertion position when inserted.

It is preferred that the axial displacement be by dropping.

It is preferred that at least one previously inserted ring is held at the storage position by clamping the conductors between a ring arrangement slide and an annular region of the collecting receptacle.

It is preferred that the axial displacement takes place by means of gravity by moving a support device away.

It is preferred that the axial displacement takes place by means of a relative movement between the collecting receptacle and a ring positioning device.

It is preferred that the axial displacement takes place by a relative movement between an upper part and a lower part of the collecting receptacle or between an upper part of the collecting receptacle and a ring positioning device.

Accordingly, it is preferred that the axial displacement of the rings takes place by means of gravity. This can be done on the one hand by moving movable stops inwards, for example, and the rings then falling due to the force of gravity, or alternatively, that a relative movement between the collecting receptacle and the ring positioning device takes place— preferably actuated by actuation—and the rings of this movement also then also follow through gravity. The rings can also be moved by a separate upper part of the collecting receptacle which is movable relative to a lower part of the collecting receptacle and/or the ring positioning device and on which the rings rest when they are transferred from the insertion position to the storage position.

It is preferred that the axial displacement of the respective ring from the insertion position into a lower stop position than the storage position takes place, in which the U-shaped ends of the conductors rest on webs of the collecting receptacle which delimit the grooves in the circumferential direction. This also works for I-pins with a kink.

It is preferred that the ring arrangement method is carried out with a ring arrangement device according to one of the above configurations.

The ring arrangement method preferably comprises the step:

raising the ring arrangement formed from at least the first and the second ring from the storage position into a raised position for transfer to a separate joining device for inserting the ring arrangement into the component.

According to a further aspect, the invention provides a computer program product comprising control instructions which, when loaded into a controller of a ring arrangement device according to one of the preceding embodiments, cause the ring arrangement device to carry out the ring arrangement method according to one of the preceding configurations.

Particularly preferred embodiments of the invention provide a device for pre-inserting all rings. All rings that are to be put into a ring arrangement can be pre-inserted in a single device.

The pre-insertion is preferably carried out with a gripping device in the form of a hairpin gripper, as described and shown in detail in German patent application DE 10 2019 114 221.0.

An advantage of preferred embodiments of the invention is that the pre-inserted nests are omitted and all rings (e.g., outer, middle and inner ring) can be pre-inserted in one device.

A preferred embodiment of a ring arrangement and joining method has in particular the following sequence:

1. Pre-inserting the individual pins, preferably with a hairpin gripper, into a plurality of rings, such as, for example, outer, middle and inner rings, into the ring arrangement device according to one of the above configurations.

2. Lifting all rings out of the device with a joining device, for example the joining device known from [1] or [2]

3. Joining all rings in the stator with the joining device

Some advantages of preferred embodiments of the invention are:

Significant cycle time advantages

Clearly "leaner process"

There are no pre-insertion nests

The entire handling of the pre-insertion nests (feed-discharge to the joining unit) is eliminated More compact system construction possible Some special advantages and features of preferred embodiments of the invention are explained in more detail below:

When pinning, it is very desirable that the ring or pins of the ring that have already been pre-inserted protrude from the nest. This is due to the fact that hairpins already in the nest (i.e., pins already pre-inserted) should be able to be moved away easily by the pre-insertion movement of the pin currently in the pre-insertion process (pin that is currently in the hairpin gripper) in order to enable or facilitate pre-insertion. The pre-inserted pins receive the desired "freedom of movement" especially when they protrude from the nest at a defined height. When inserting a ring, conductors that are already in the nest, such as hairpins in particular, therefore preferably protrude from the receptacle.

Because all the rings are now to be pre-inserted into a ring arrangement device—without using several specific pre-insertion nests, it is an idea of preferred refinements of the invention to include a fully pre-inserted first ring (e.g., started with an outer ring) in the ring arrangement device—that is, for the pre-insertion to transfer the intended elevated position into a lower position in order to then be able to put the second ring, e.g., central ring, or its conductors (e.g., hairpins), which is then able to be pre-inserted again, into an elevated position in the ring arrangement device. When the center ring is put in place, for example, the outer ring that has already been put in is in a lower position and the center ring that is currently in the process of being placed is in an elevated position.

After all rings (e.g., outer, middle, inner ring) have been inserted into the ring arrangement device, it is advantageous to lift all the rings back into the raised position, since in this position they can be easily lifted out of the ring arrangement device by the joining device then insert them into the stator—for further details on joining, see the references [1] and/or [2] mentioned above.

A preferred construction of the ring arrangement device is described below:

The ring arrangement device preferably has an inner delivery unit— example for the ring positioning device— which is enclosed by a collecting nest— example for the collecting receptacle.

The inner infeed unit preferably has radially movable slides which are actuated by a mechanism in the center (the kinematics can function in different ways). The inner feed unit is preferably axially, in particular vertically, movable.

As a result, all the rings/the entire package—ring arrangement—can be lifted out of the ring arrangement device after being pre-inserted in order to lift them out using the joining device (cf. [1]).

This allows the individual rings to be incorporated into the device in a controlled manner.

The collecting nest preferably has grooves, similar to those of the stator, only that their dimensions (larger outer diameter, smaller inner diameter, larger tangential groove width on both sides) are significantly larger—this makes it easier to insert the pins because the positioning of the pins, for example, using a robot from aspects of accuracy, is made possible. The collecting nest preferably has an annular outer contour and webs tapering radially to the center, but then no annular inner contour. The webs form grooves (which are open towards the center) into which the slides of the inner delivery unit can move in such a way that they close the grooves— seen from above—and thus represent a kind of "intermediate floor" for the pin ends of the pins to be inserted on which the pin is placed with its two leg ends. In another embodiment, the arrangement of the delivery unit and the collecting nest is mirrored—the collecting nest is inside and the delivery unit is outside.

Figure 2:
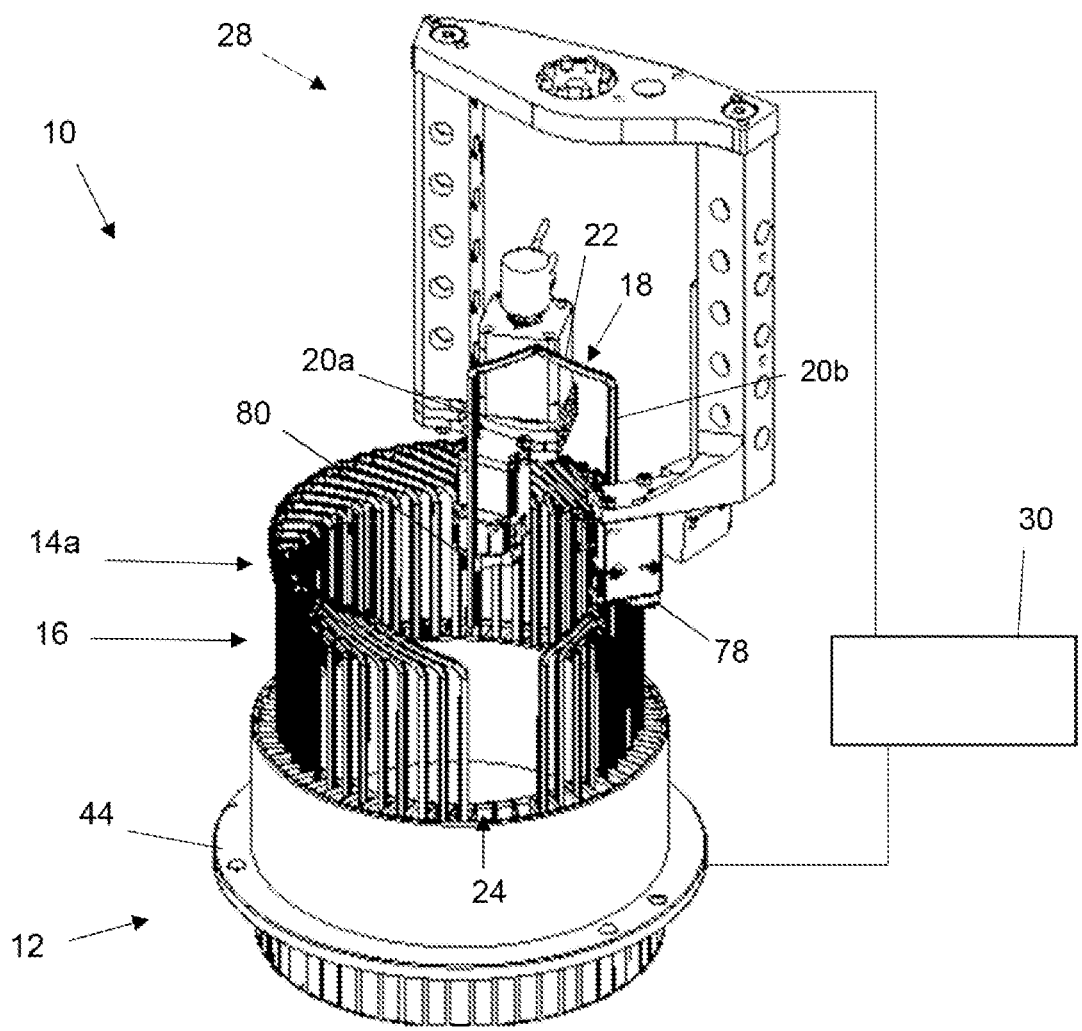
Figure 3:
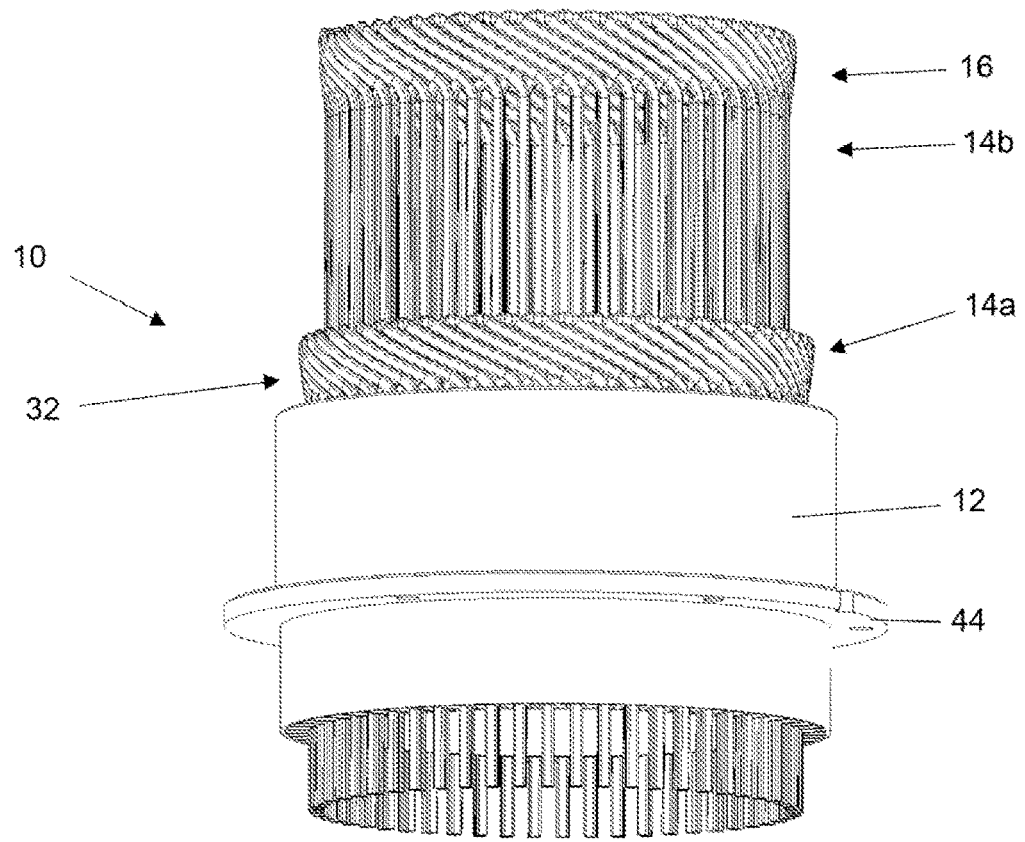
Figure 4:
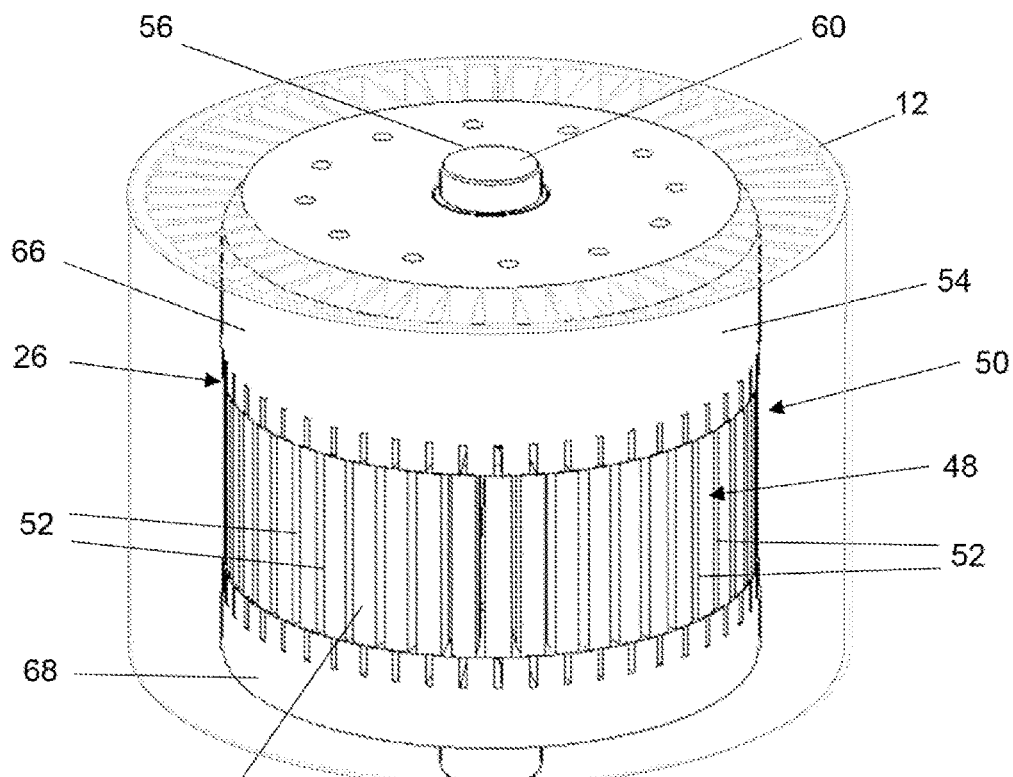
Figure 5:
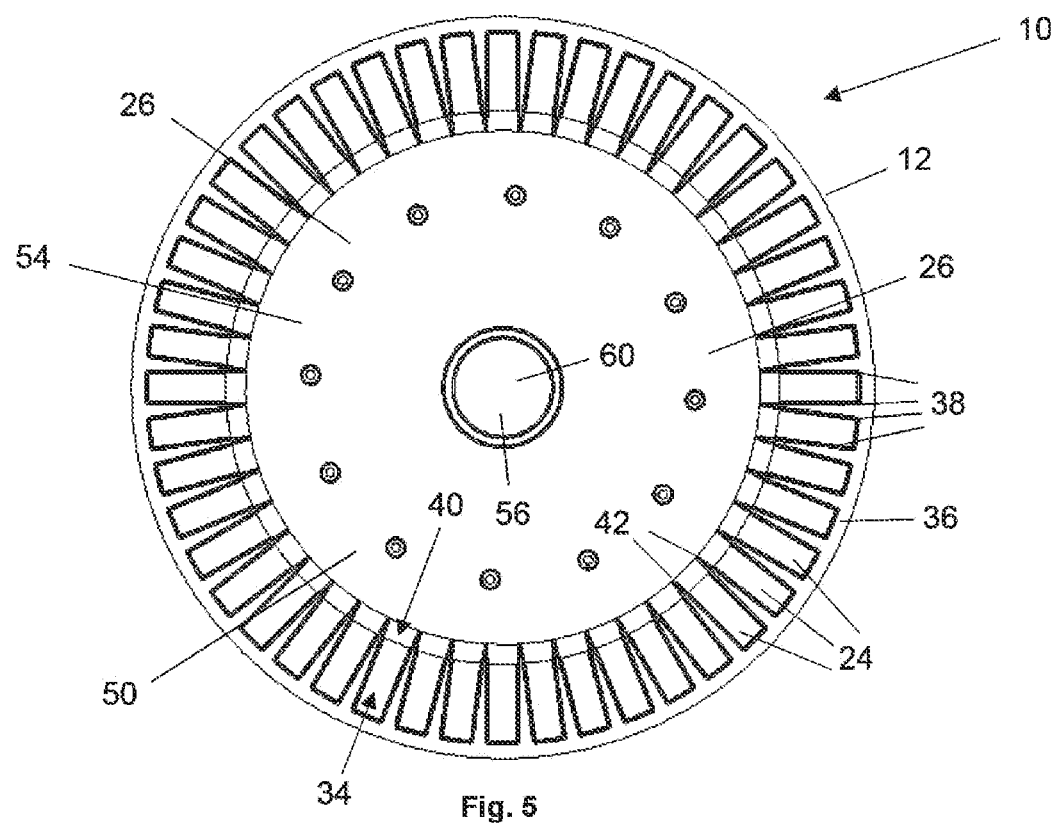
Figure 6:
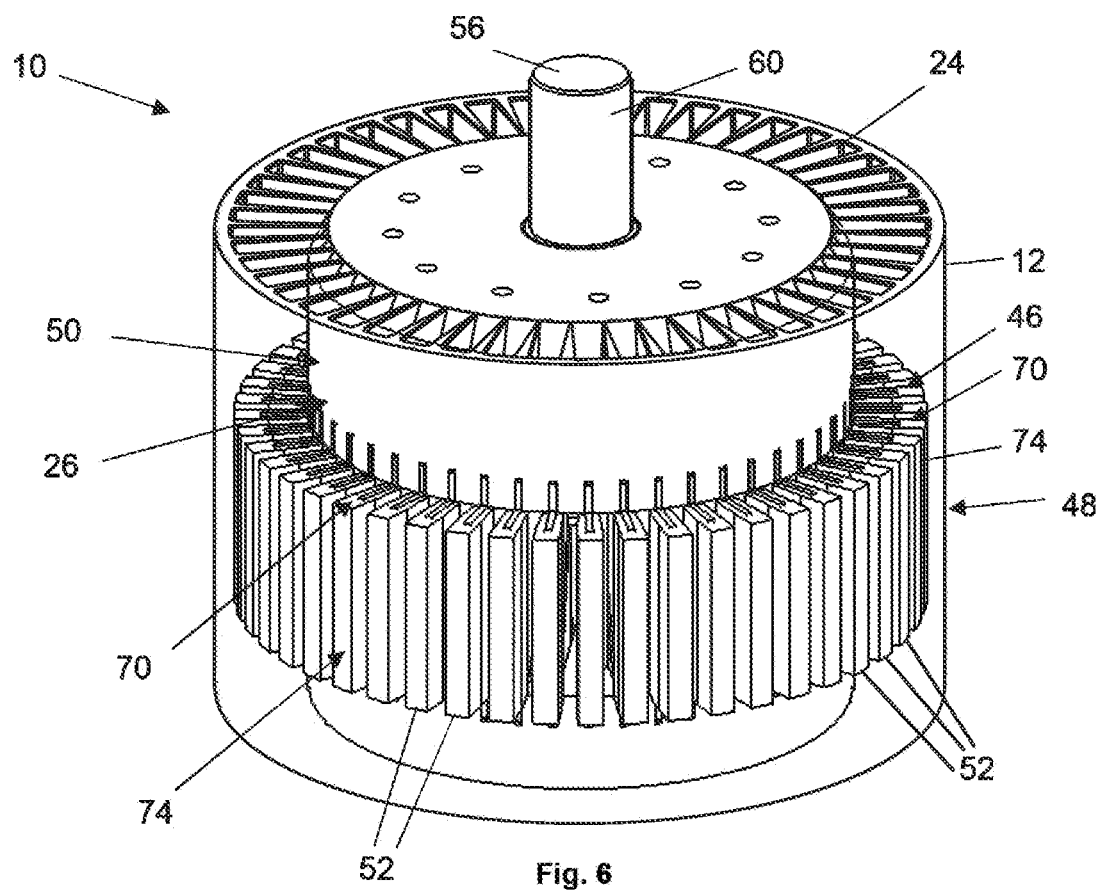

Embodiments of the invention are explained in more detail below with reference to the accompanying drawings. It shows:

FIG. 1 a perspective view of an embodiment of a ring arrangement device with a pre-inserted first ring of electrical conductors in a plug-in position;

FIG. 2 is a schematic perspective view of the ring arrangement device during an insertion process of the first ring;

FIG. 3 a perspective view of the ring arrangement device, wherein the first ring is in a storage position and a second ring is in the insertion position;

FIG. 4 a schematic representation of a ring positioning device of the ring arrangement device, which is arranged within a collective receptacle of the ring arrangement device;

FIG. 5 a plan view of the ring arrangement device with the collecting receptacle and the ring positioning device;

FIG. 6 a view comparable to FIG. 4, wherein the ring positioning device is in a different position.

Figure 7:
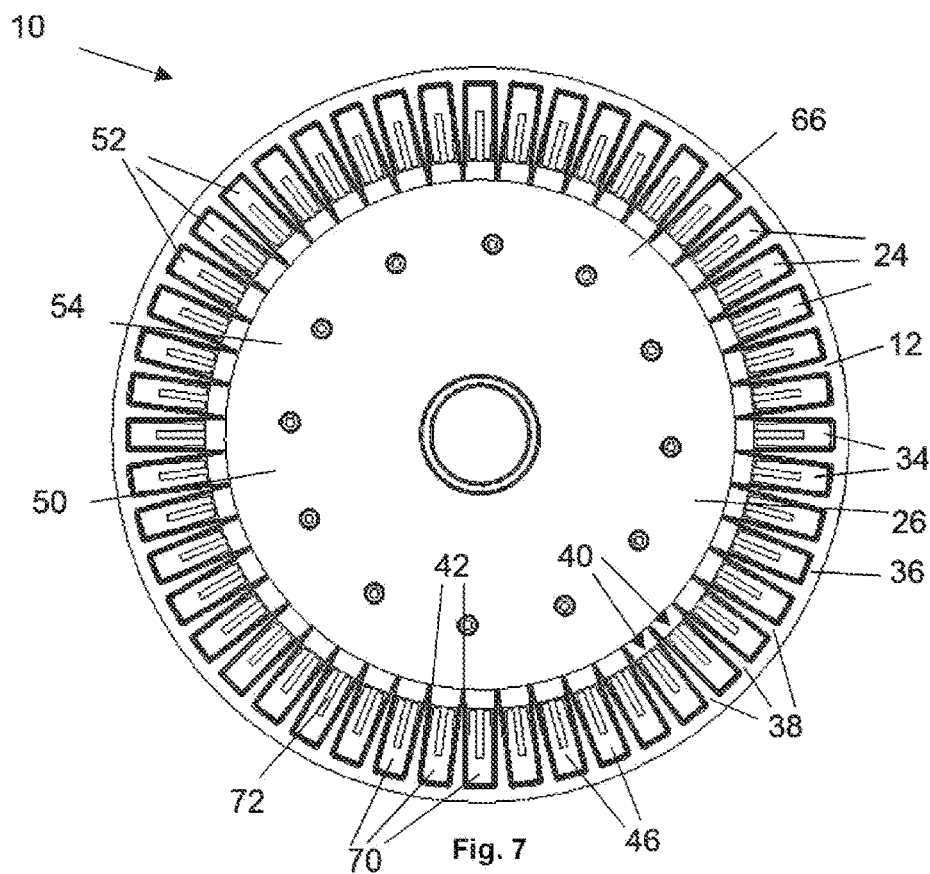

FIG. 7 a view comparable to FIG. 5, wherein the ring positioning device is in the position shown in FIG. 6.

Figure 8:
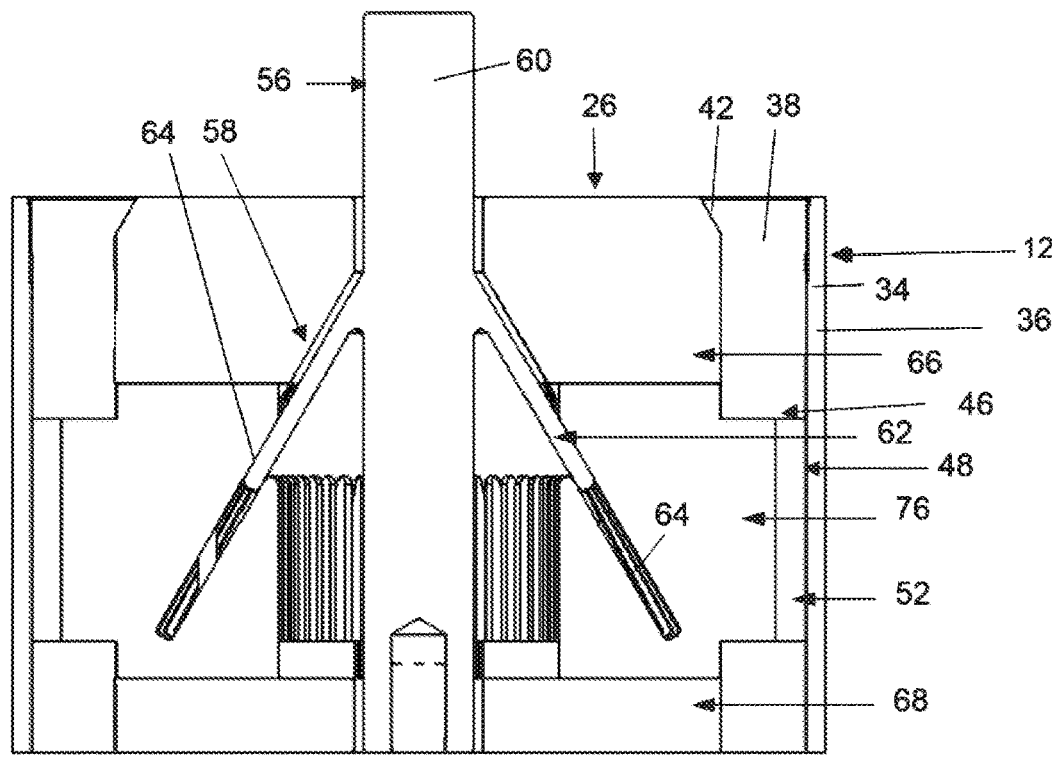
Figure 9:
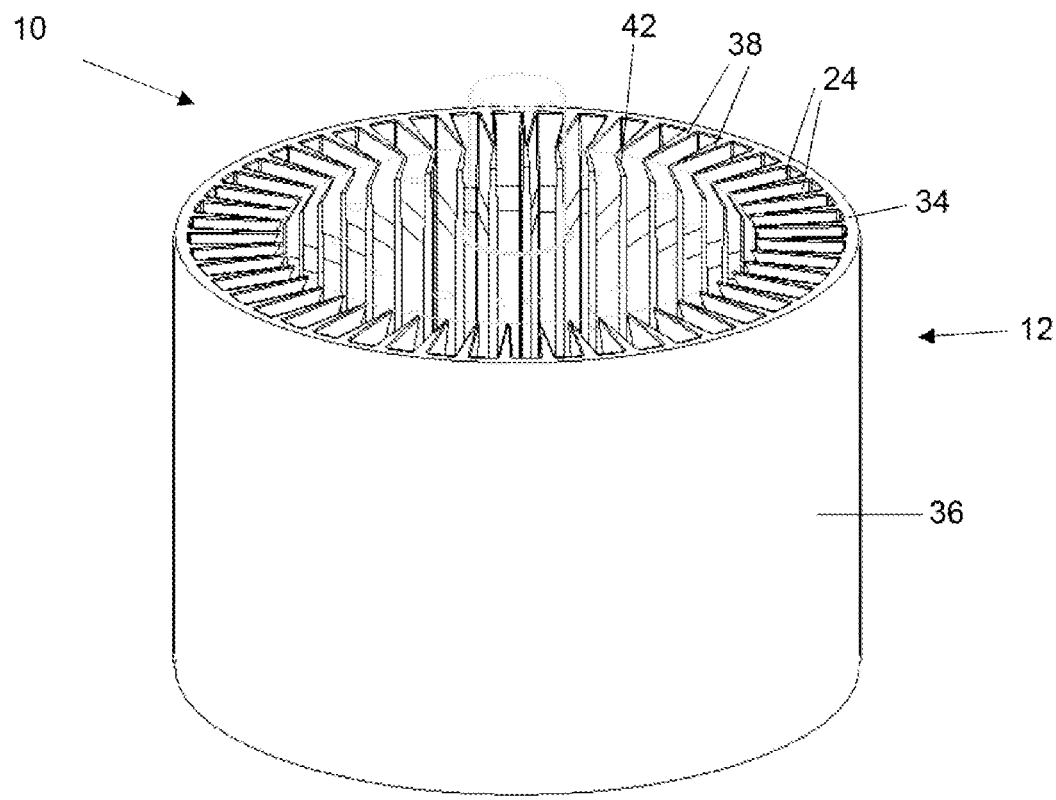
Figure 10:
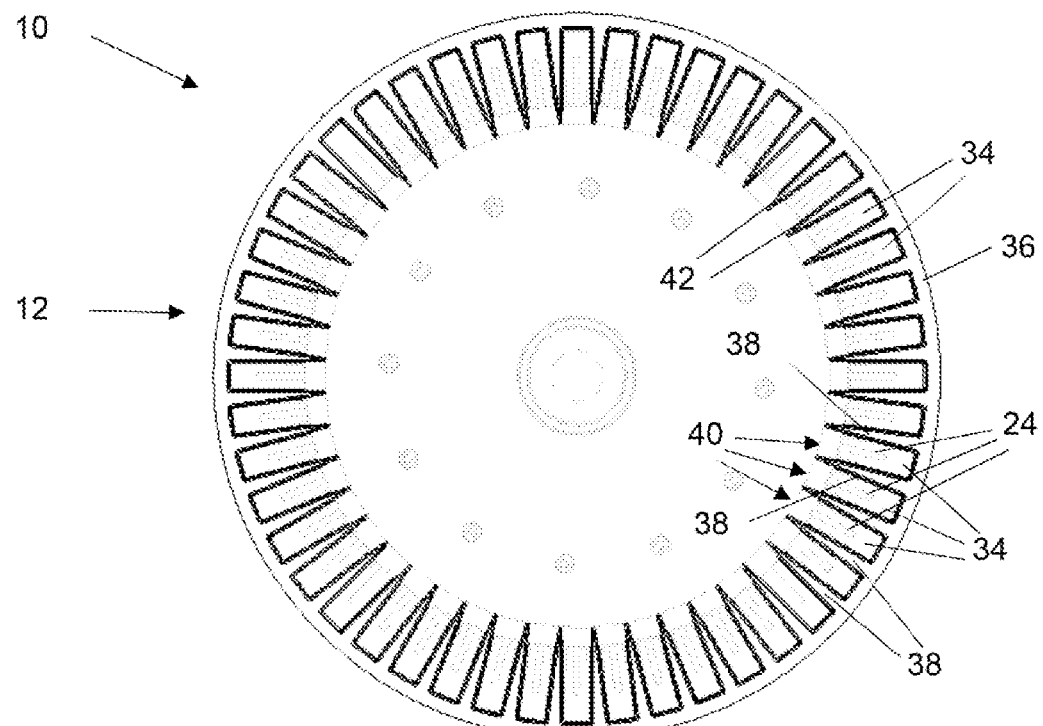
Figure 11:
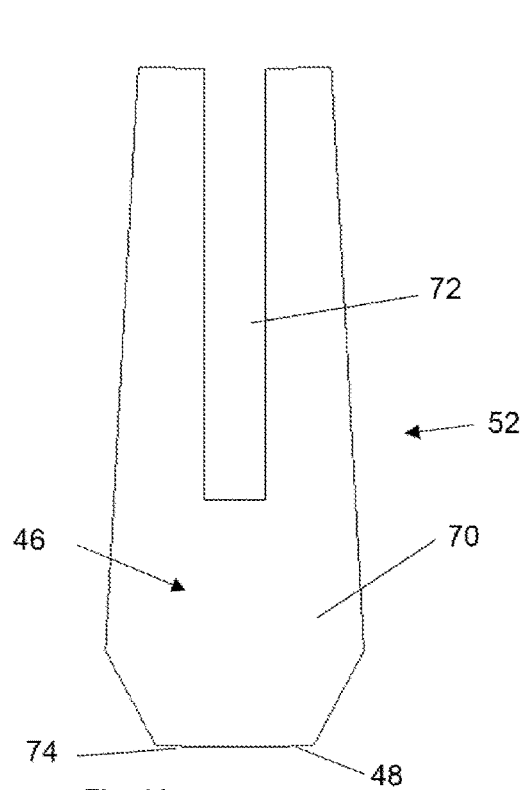
Figure 12:
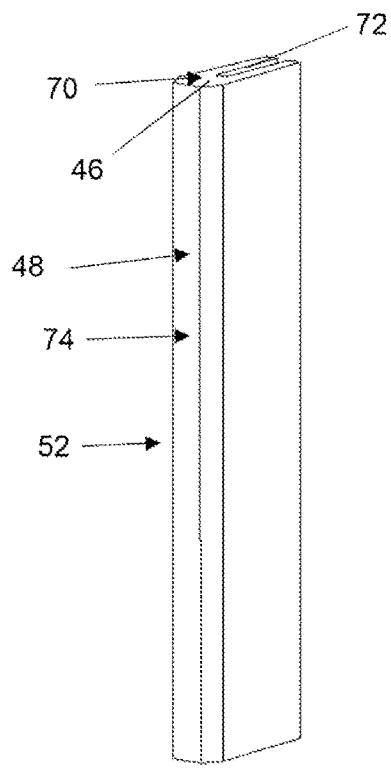

FIG. 8 a section through the ring positioning device;

FIG. 9 a perspective view of the collecting receptacle;

FIG. 10 an axial plan view of the collecting receptacle;

FIG. 11 a plan view of a slide of the ring positioning device;

FIG. 12 a perspective view of the slide of the ring positioning device

Figure 13:
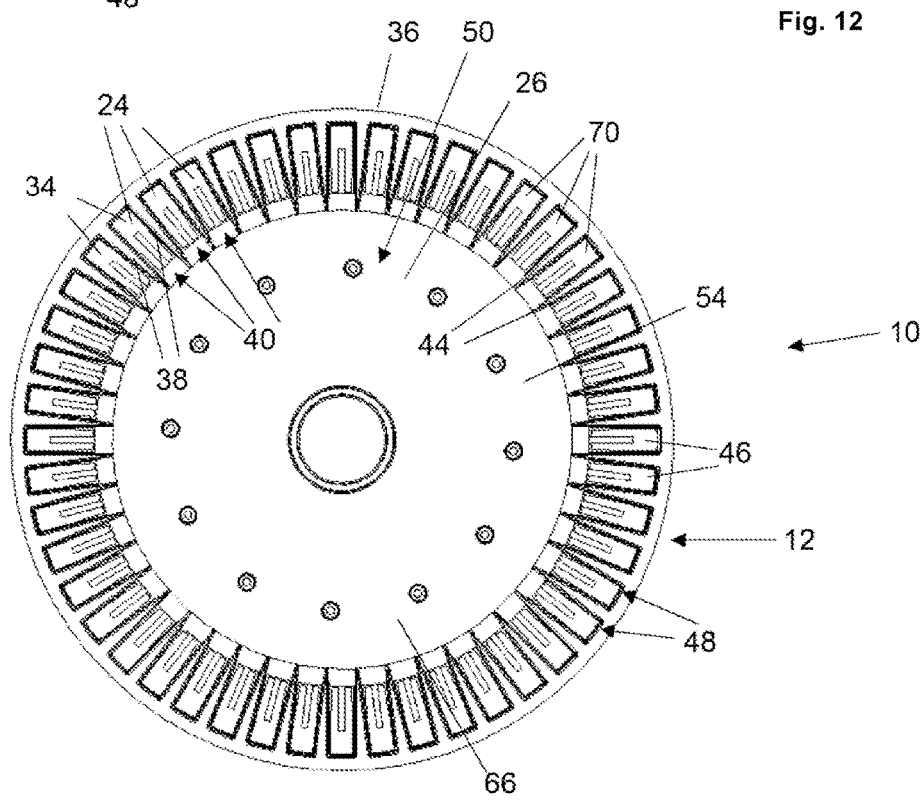
Figure 14:
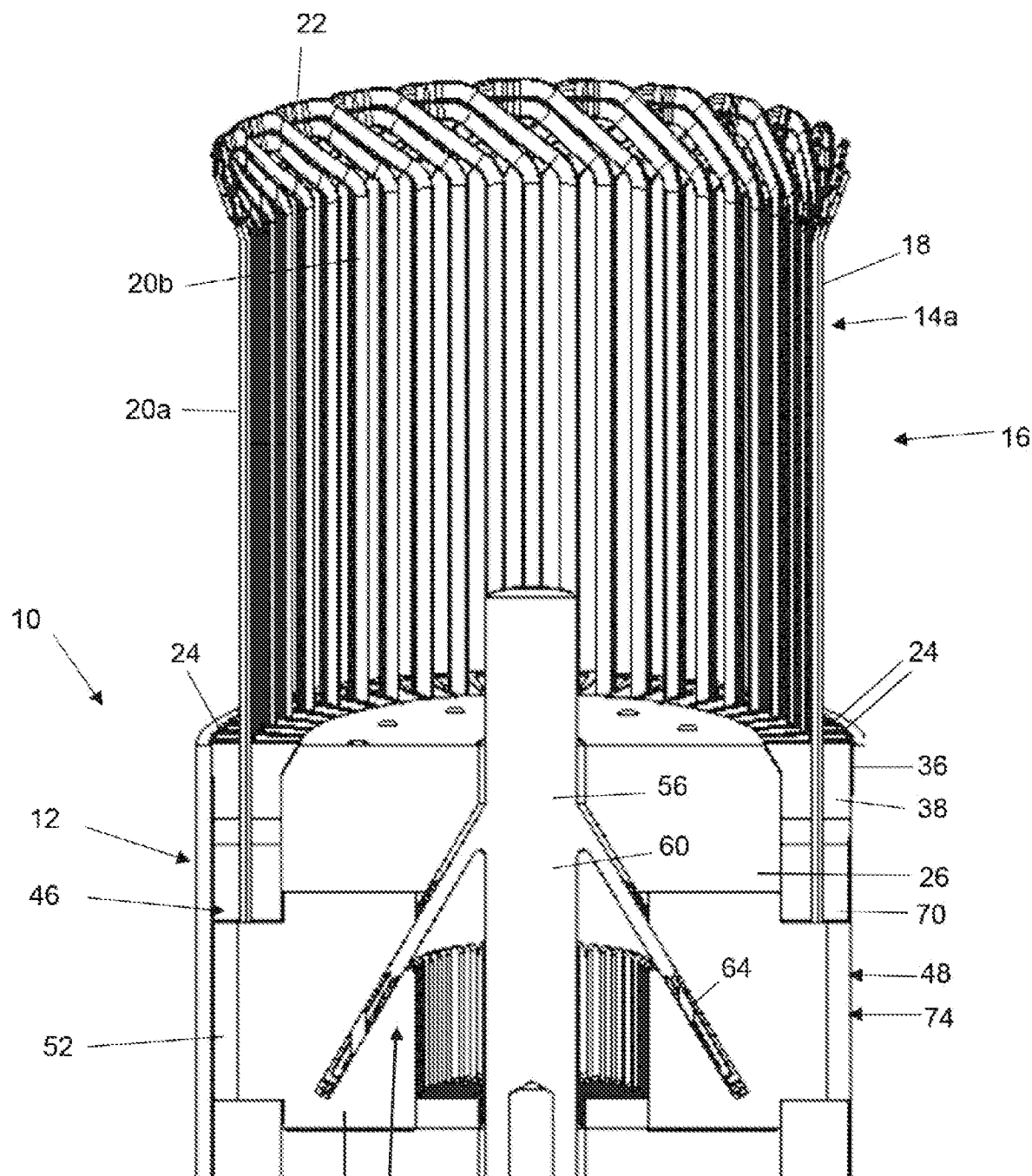
Figure 15:
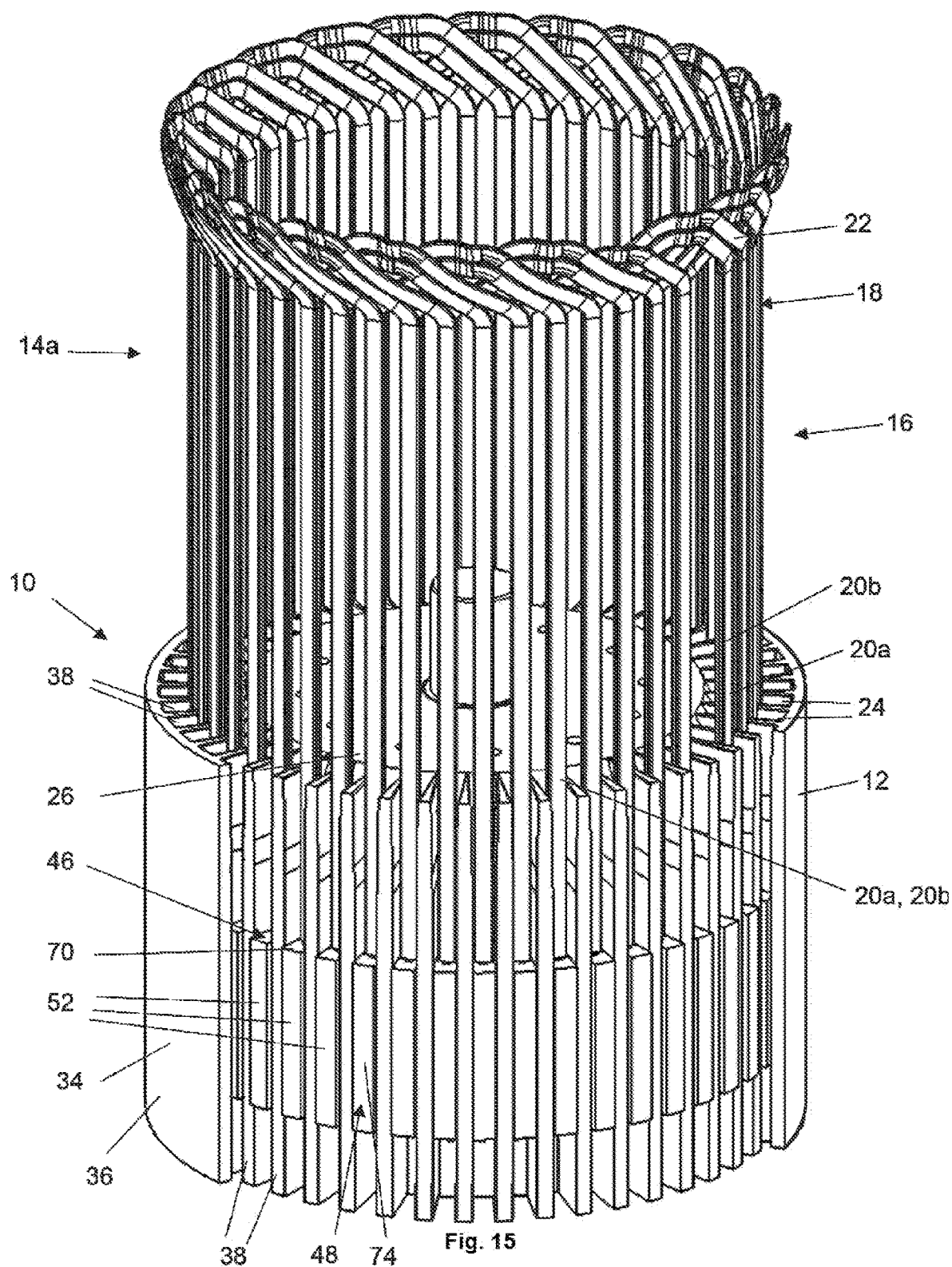
Figure 16:
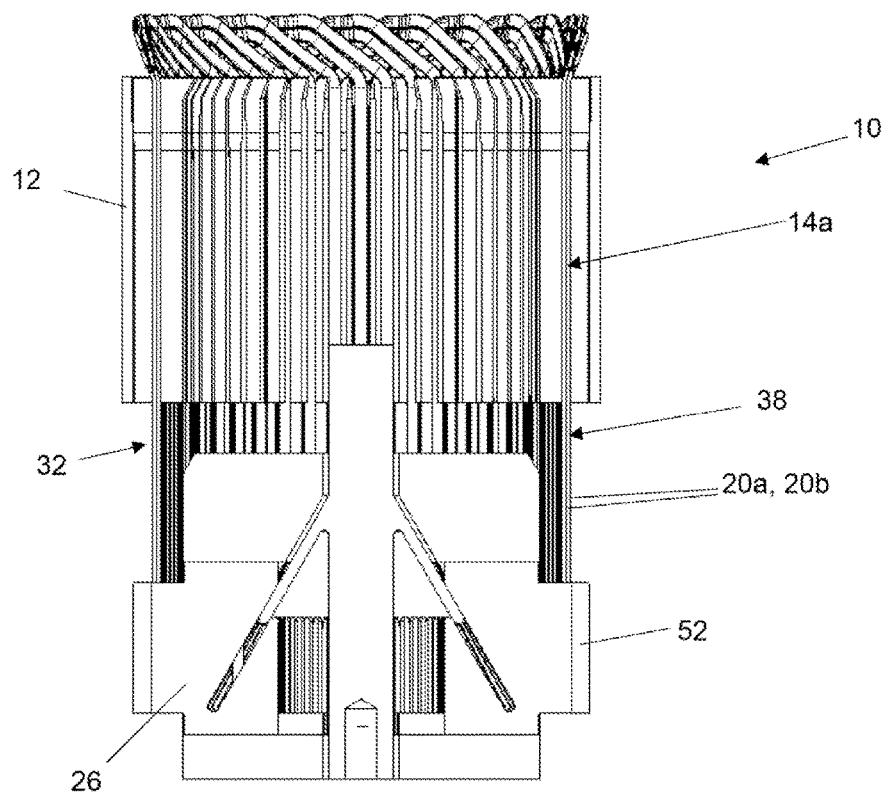
Figure 17:
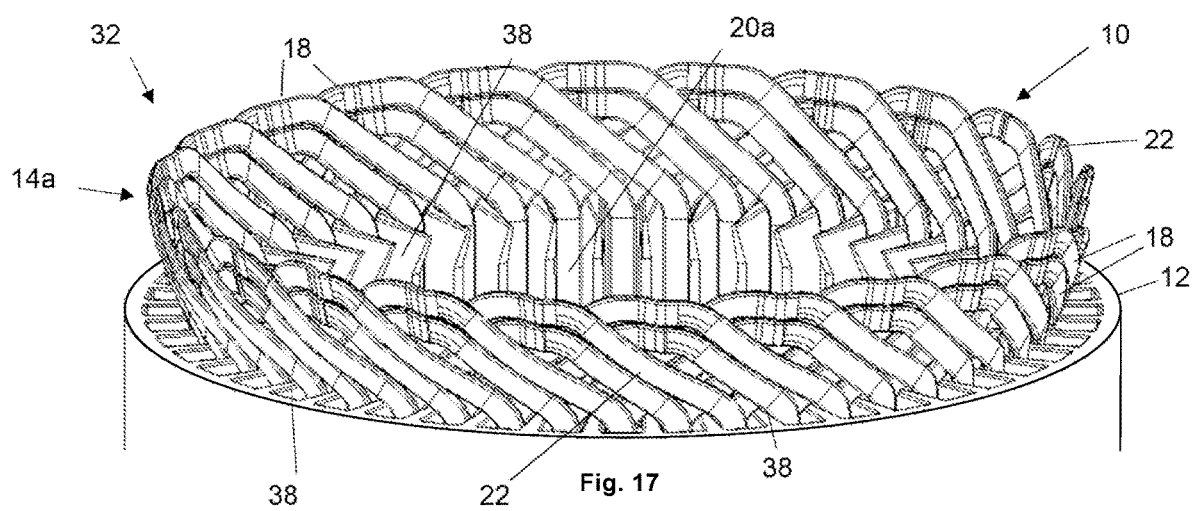
Figure 18:
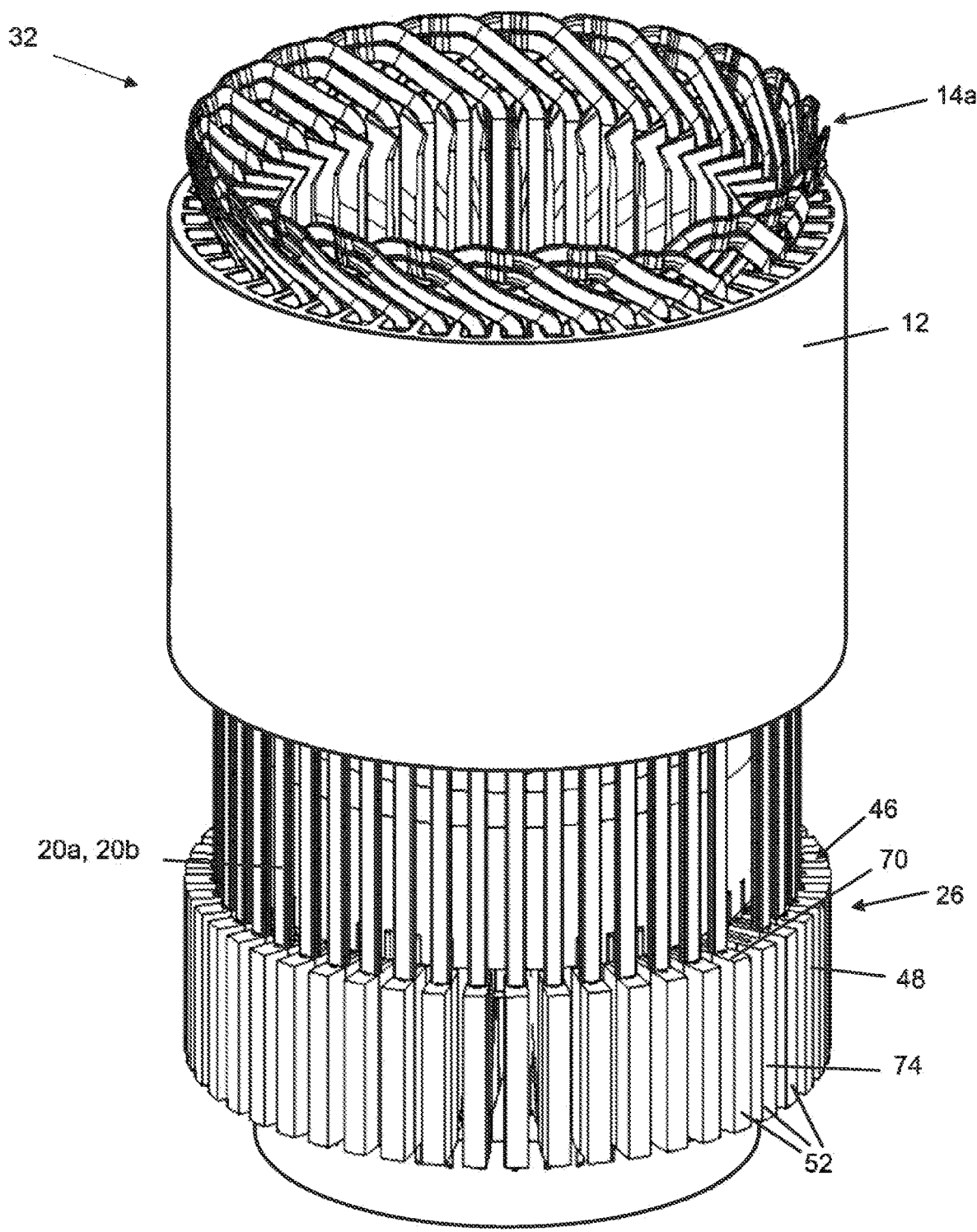
Figure 19:
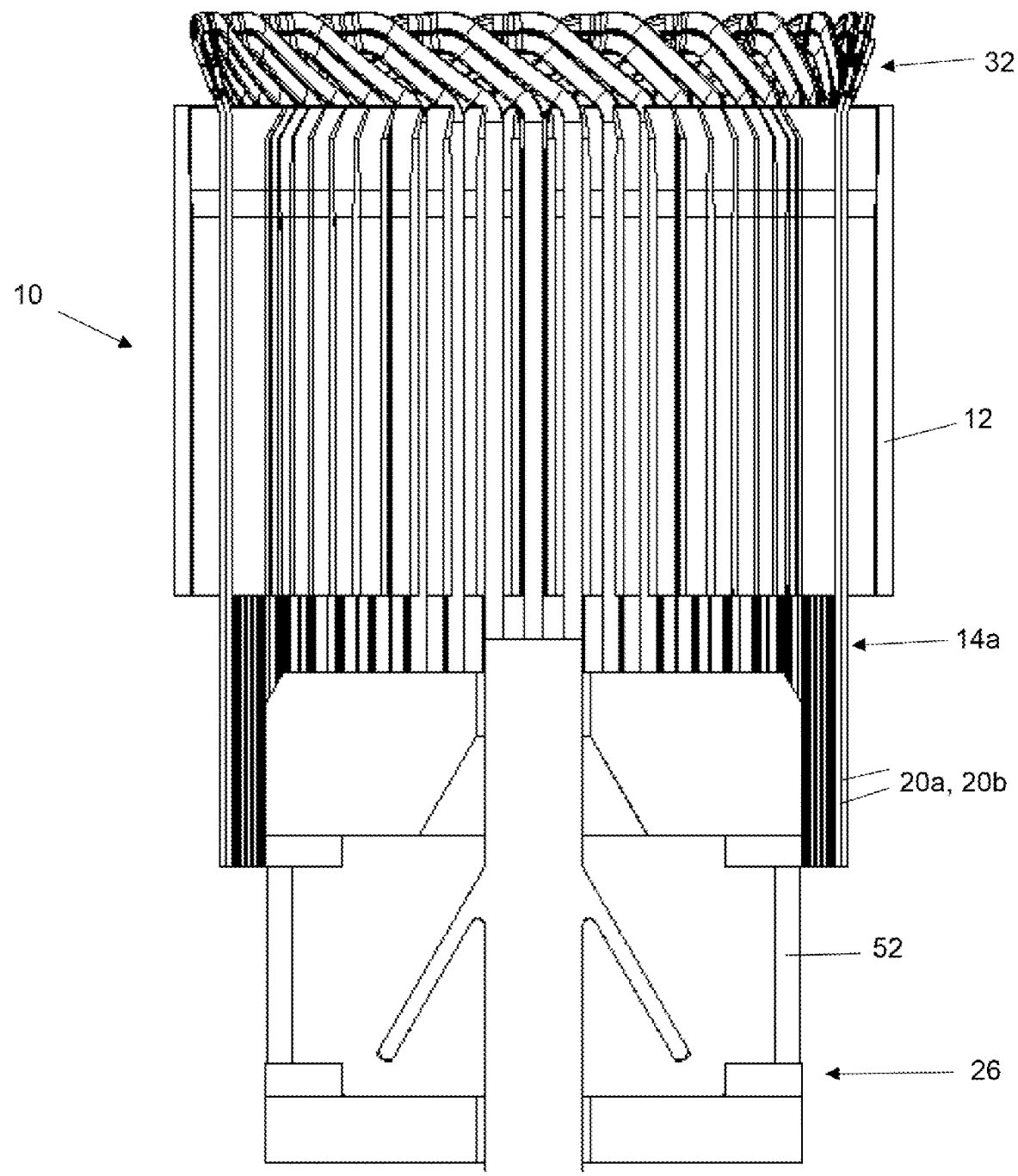
Figure 20:
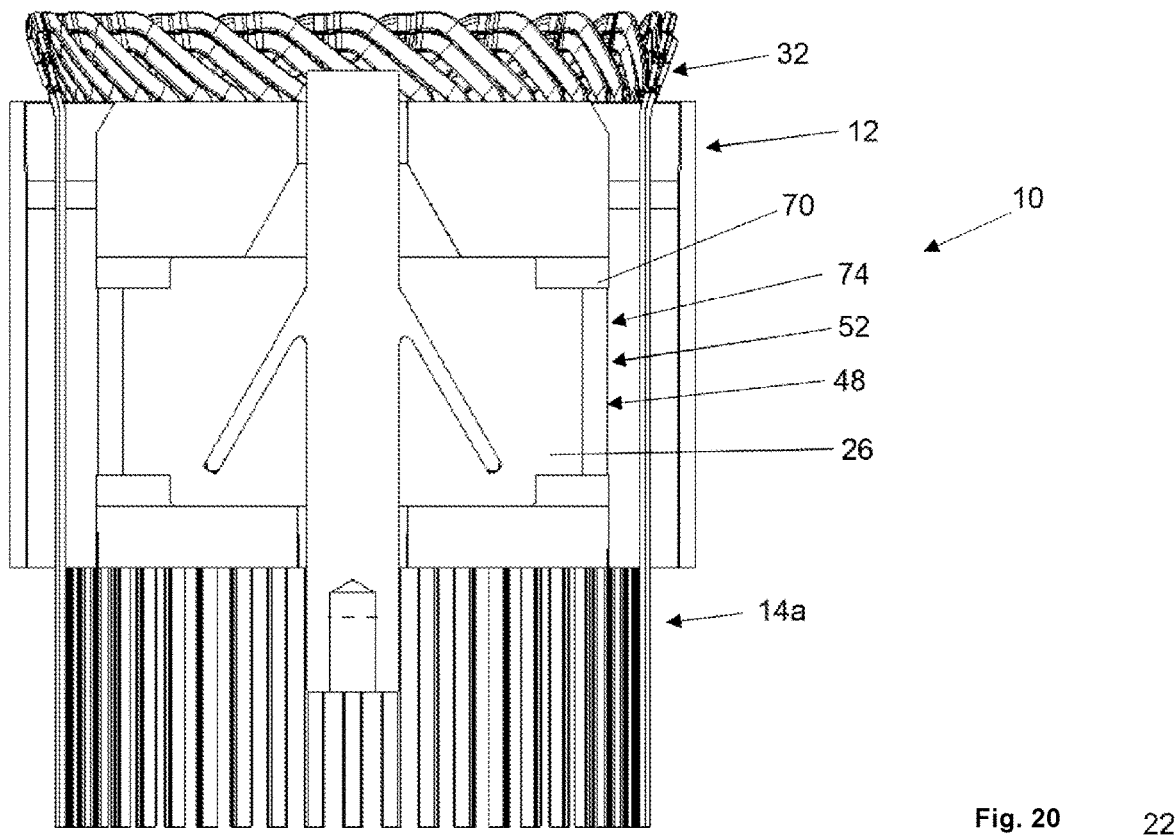
Figure 21:
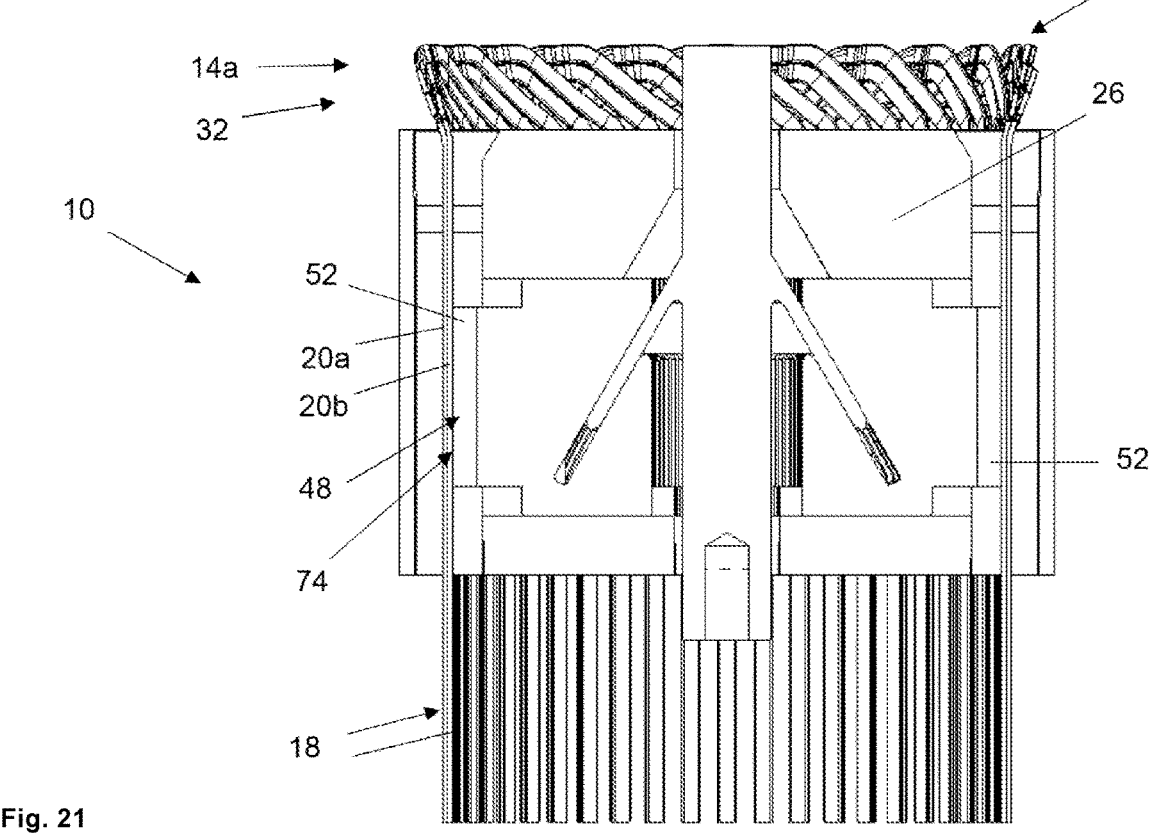
Figure 22:
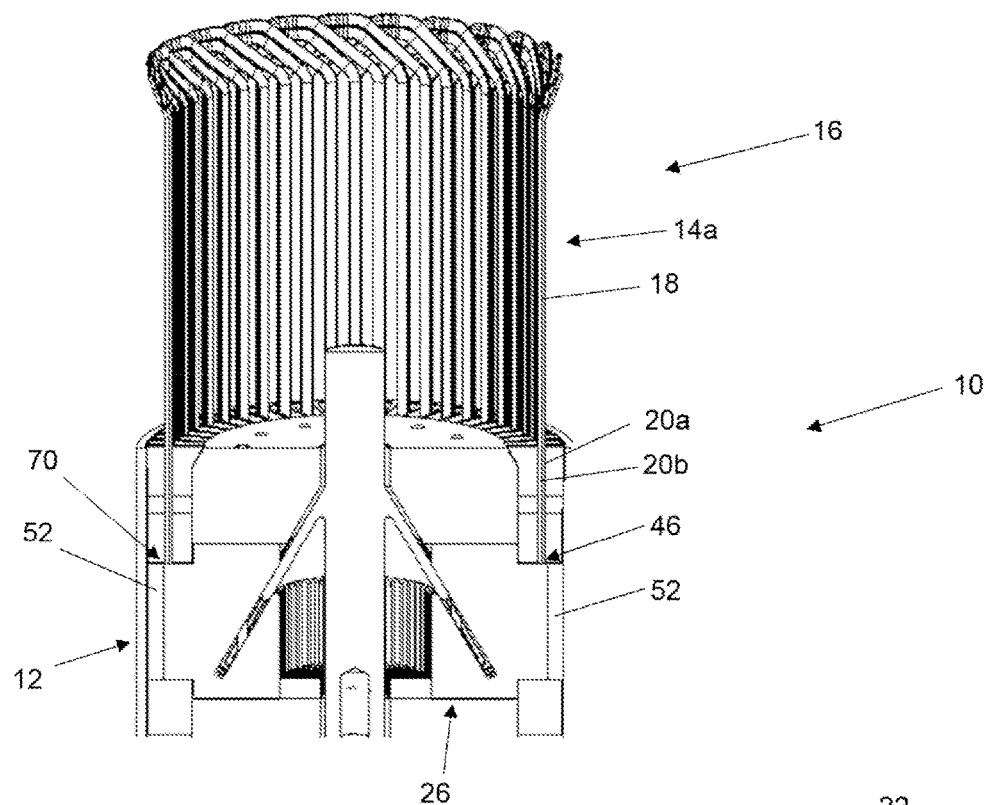
Figure 23:
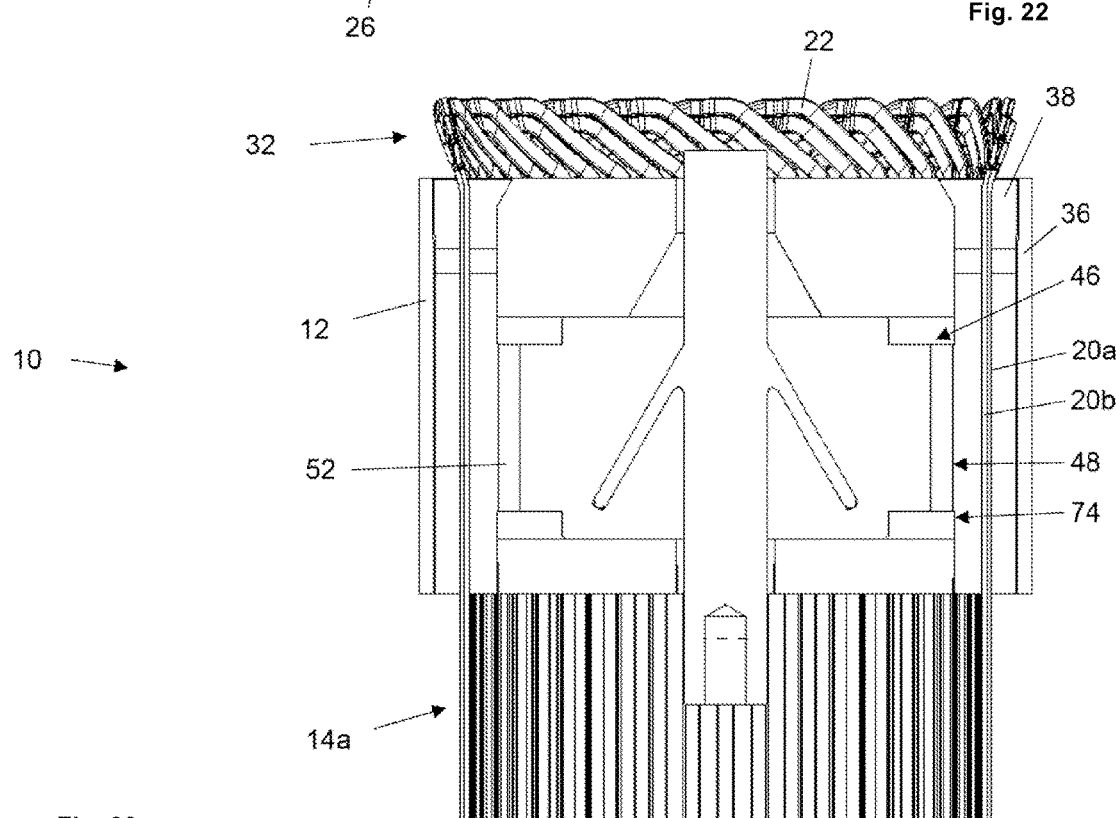
Figure 24:
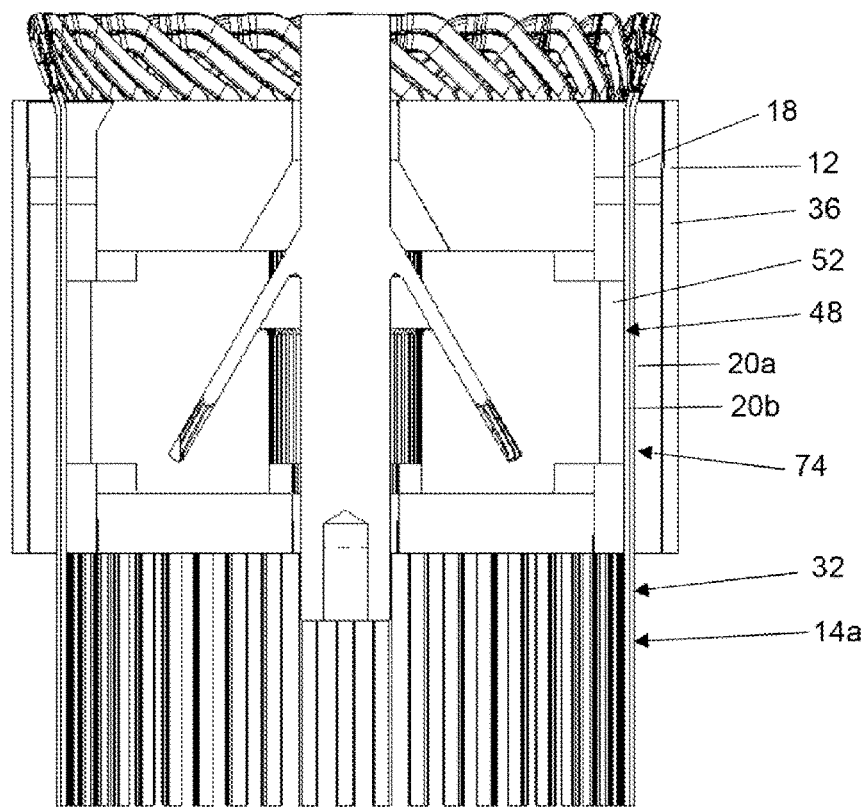
Figure 25:
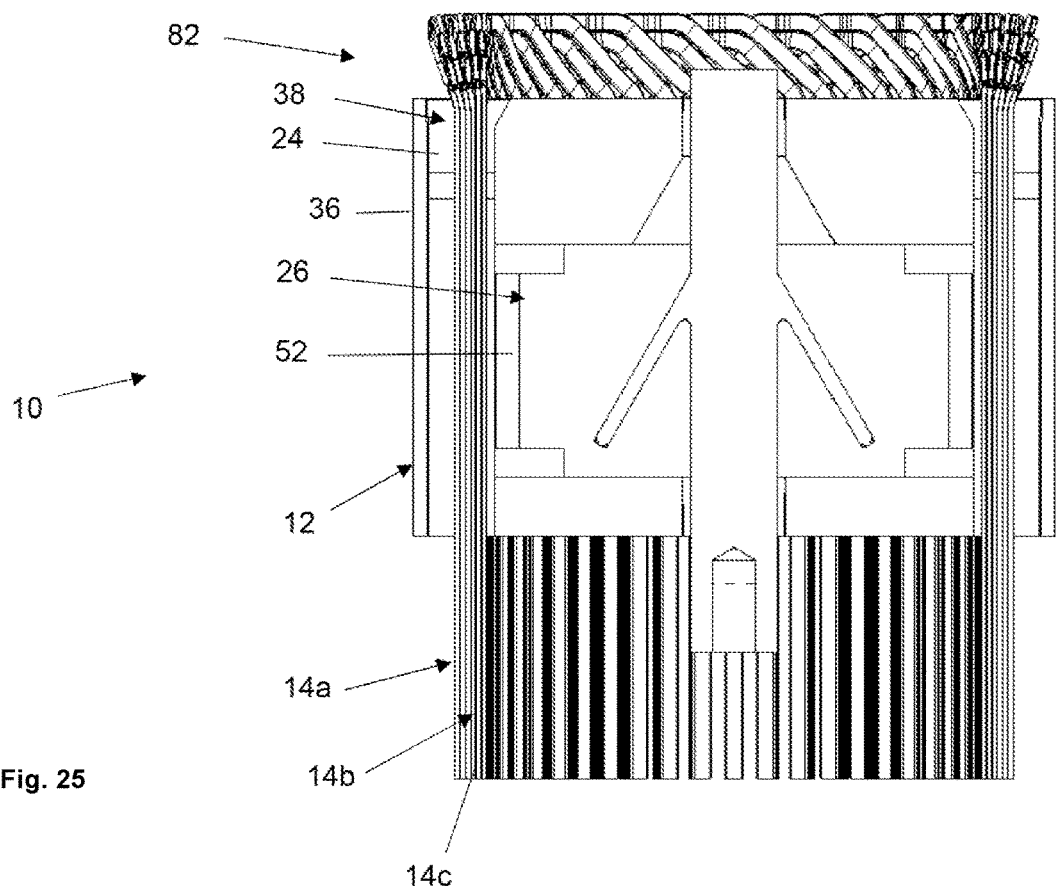
Figure 26:
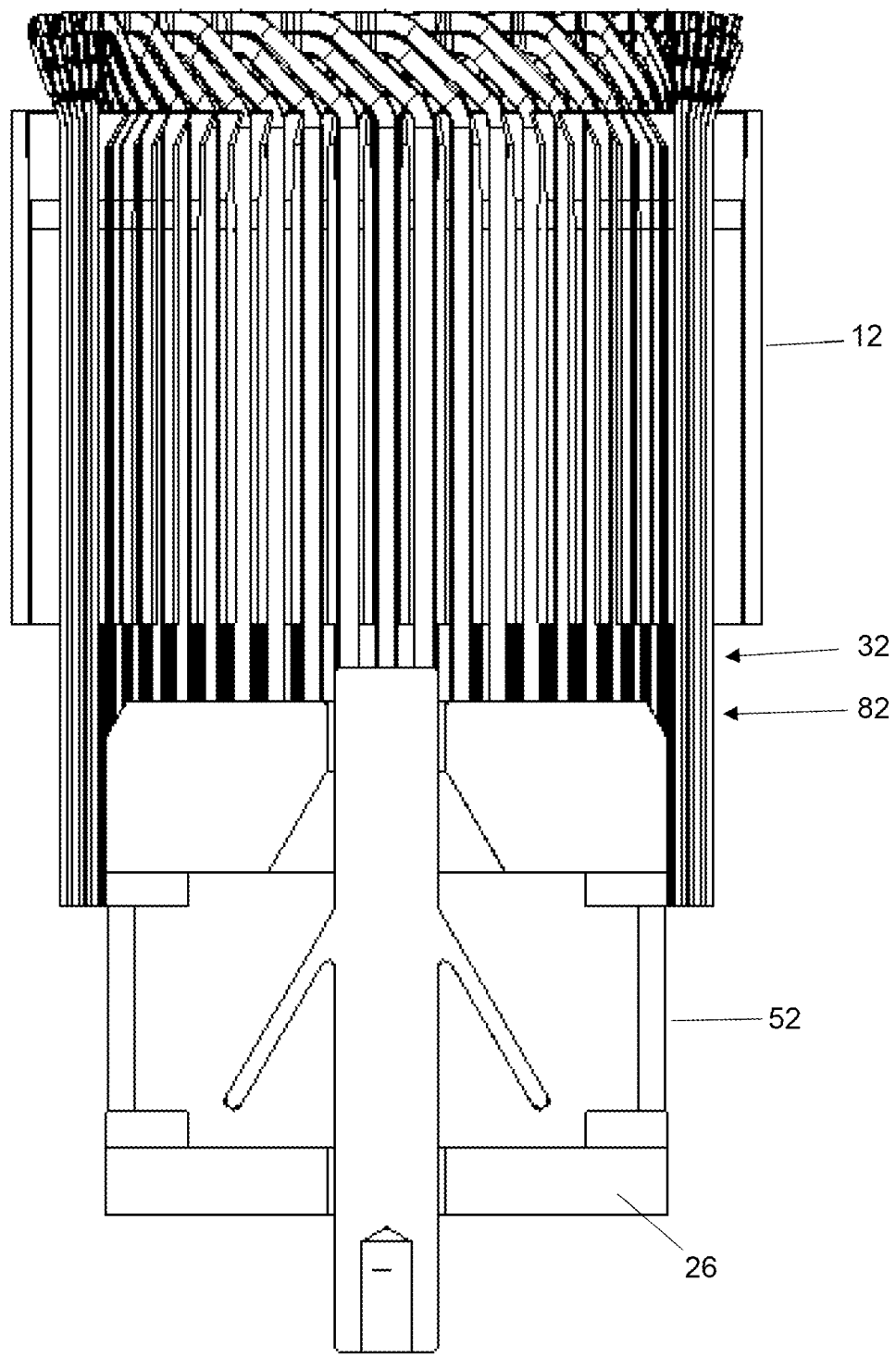
Figure 27:
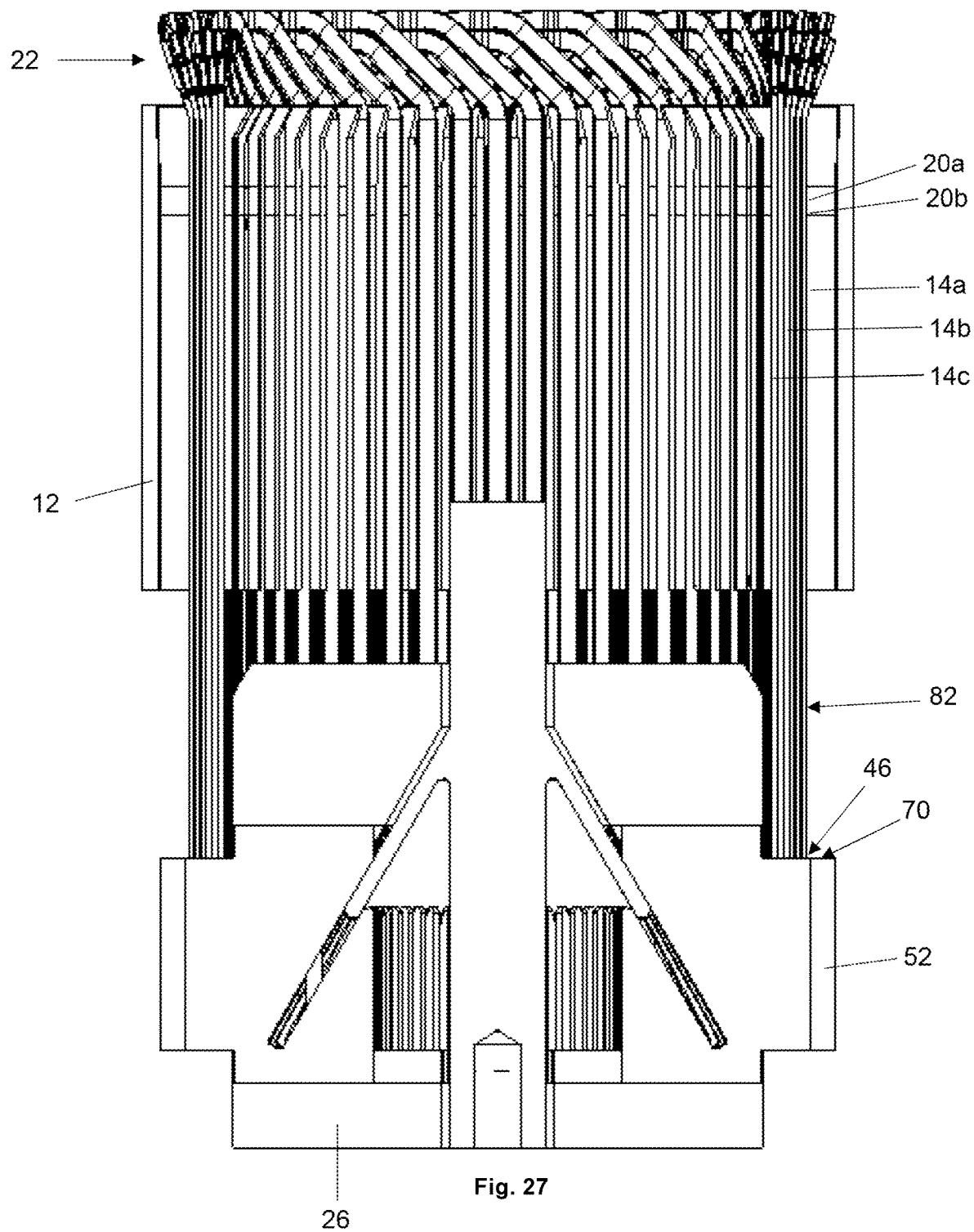
Figure 28:
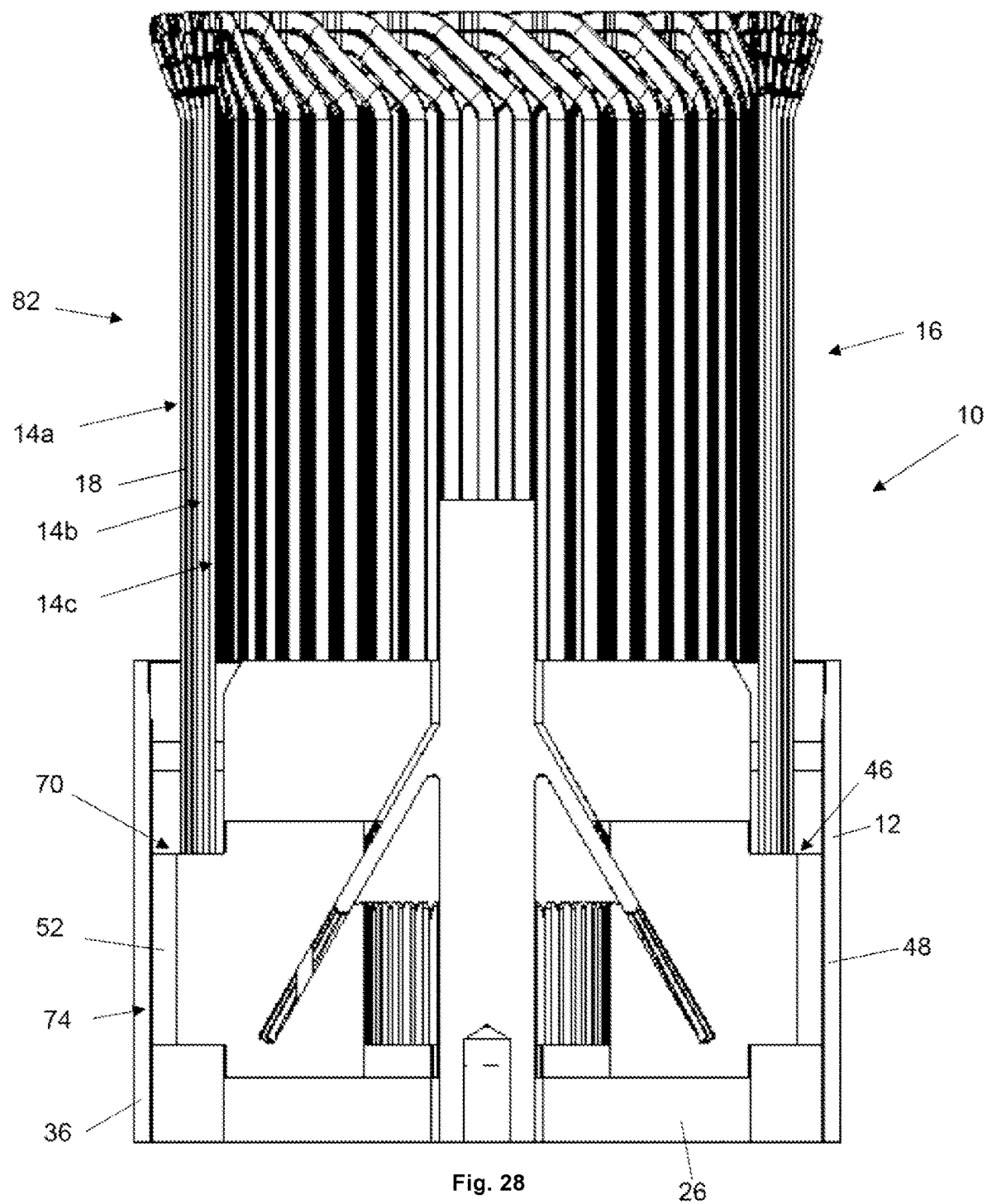

FIG. 13 a plan view of the ring arrangement device with the slides extended;

FIG. 14 a partially sectioned illustration of the ring arrangement device with the pre-inserted first ring in the inserted position;

FIG. 15 a perspective view of the ring arrangement device with the first ring in the insertion position, wherein an outer jacket of the collecting receptacle has been omitted for illustration purposes;

FIG. 16 a section through the ring arrangement device, wherein the first ring has been transferred to a storage position;

FIG. 17 the top end of the ring arrangement device in the position of FIG. 16;

FIG. 18 a perspective view of the ring arrangement device in the position of FIG. 16;

FIG. 19 a section through the ring arrangement device when the ring positioning device moves into a position for inserting the second ring;

FIG. 20 a further intermediate position of the ring positioning device before inserting the second ring;

FIG. 21 a section through the ring arrangement device in a position in which the second ring can be inserted as shown in FIG. 3;

FIG. 22 a section through the ring arrangement device when inserting the second ring (first ring omitted for clarity);

FIG. 23 a section through the ring arranging device after the second ring has been transferred to a storage position (first ring omitted for overview purposes);

FIG. 24 a section through the ring arrangement device in a position in which a third ring can be inserted;

FIG. 25 a sectional view through the ring arrangement device, wherein a first to third ring are in a storage position;

FIG. 26 a sectional view through the ring arrangement device in an intermediate step before lifting the ring arrangement and FIG. 27 a section through the ring arrangement device in a further intermediate step shortly before lifting the ring arrangement, and FIG. 28 a section through the ring arrangement device in a position for lifting the ring arrangement.

The exemplary embodiments described in more detail below are described with reference to the production of a stator with three rings of hairpins (outer, middle and inner ring) as conductors. In other configurations not detailed here, fewer or more rings are also provided. I-Pins can also be used as conductors instead of hairpins.

Based on FIGS. 1 to 12, a first embodiment of a ring arrangement device 10 for forming a ring arrangement from a plurality of concentrically arranged rings of electrical conductors is shown below. Subsequently, based on the illustration in FIGS. 13 to 28, an embodiment of a ring arrangement method which is feasible with the ring arrangement device 10 for forming a ring arrangement from the plurality of concentrically arranged rings of electrical conductors is explained.

FIG. 1 shows a perspective illustration of a collecting receptacle 12 of the ring arrangement device 10 with a pre-inserted first ring 14a in an axial insertion position 16, in which the first ring 14a protrudes further from the collecting receptacle 12.

The first ring 14a is formed from a plurality of U-shaped conductors, hereinafter called hairpins 18. Each hairpin 18 has a first leg 20a, a second leg 20b and a roof bend 22 between the legs 20a, 20b. The legs 20a, 20b are inserted into grooves 24 of the collecting receptacle 12 when inserted. The process of insertion is shown in FIG. 2. In FIG. 2, the ring arrangement device 10 has, in addition to the collecting receptacle 12, a ring positioning device 26, a gripping device 28 and a controller 30.

The first ring 14a can be inserted into the collecting receptacle 12 with the gripping device 28.

As shown in FIG. 3, the ring arrangement device 10 is designed in such a way that it transfers the first ring 14a out of the axial insertion position 16, in which the hairpins 18 of the first ring 14a further protrude upward from the collecting receptacle 12—raised insertion position—into a storage position 32, in which the hairpins of the first ring 14a are further inserted into the collecting receptacle 12, in order to then insert a second ring 14b in the axial insertion position 16 in the same collecting receptacle 12. The raised axial insertion position 16, in which the hairpins 18 of the ring 14a, 14b to be inserted in each case project further, is advantageous in order to provide sufficient freedom of movement for the gripping device 28 for the exact insertion of the hairpins 18 into the grooves 24 of the collecting receptacle 12.

The ring positioning device 26 serves to position the respective rings 14a, 14b and is shown in detail in FIGS. 4 to 8. FIGS. 9 and 10 show the collecting receptacle 12, and FIGS. 11 and 12 show a slide of the ring positioning device 26.

As best seen in FIGS. 9 and 10, the collecting receptacle 12 has the plurality of grooves 24 arranged in a ring around the central axis. To form the grooves 24, the collecting receptacle 12 has a groove boundary 34 extending in the circumferential direction in the form of an annular casing 36. Radial webs 38 protrude from the ring jacket 36 in a radial direction, here inwards, which limit the grooves 24 in the circumferential direction. Thus, each groove 24 has the groove boundary 34 on one radial side and an opening 40 on the other radial side, here on the inner side. In an axial top view, the grooves 24 are, as can be seen from FIG. 10, delimited approximately in a U-shape. In the illustrated embodiment, the grooves 24 are approximately rectangular in plan view.

The grooves 24 are dimensioned in the radial direction and in the circumferential direction so that their number corresponds to the number of housing grooves in a stator housing (not shown here) into which the ring arrangement is to be later inserted. However, the grooves 24 of the collecting receptacle 12 are larger in the radial direction and in the tangential direction—circumferential direction—than the housing grooves in the stator. The dimensioning of the grooves 24 is such that the legs 20a, 20b of the hairpins 18 are accommodated therein with play. The hairpins 18 are preferably formed from a rectangular wire.

As can be seen from FIGS. 8 and 9, a radial projection 42 can be formed on some or all radial webs 38 on an axial end of the collecting receptacle 12, here in particular on the axial end of the collecting receptacle 12 that is to be directed upward in the intended use. The collecting receptacle 12 can thus be supported on a corresponding axial end of the ring positioning device 26, this radial end of the ring positioning device 26 being designed to be complementary to the radial projections 42. Otherwise, as shown in FIGS. 1 to 3, an annular flange 44 or another fastening area for fastening the collecting receptacle 12 to a machine frame (not shown here in more detail) can also be provided. Alternatively, the fastening area can also be fastened to an axially movable element.

The ring positioning device 26 is shown in detail in FIGS. 4 to 8. The ring positioning device 26 is in particular axially movable relative to the collecting receptacle 12. For example, the ring positioning device 26 is fastened to an axial actuator, not shown here, with which the ring positioning device 26 can be moved in a controlled manner via the controller 30 along the central axis aligned in the vertical direction. In another embodiment, it can also be provided that the collecting receptacle 12 is movable while the ring positioning device 26 is arranged in a stationary manner.

The ring positioning device 26 has a support device 46 for supporting the electrical conductors—hairpins 18—of a ring 14a, 14b to be inserted in the insertion position 16 and a holding device 48 for holding the conductors— hairpins 18—of a completely inserted ring 14a in the storage position.

In order to form the support device 46 and the holding device 48, the ring positioning device 26, which is designed as a delivery unit 50 in the exemplary embodiment shown here, has a series of slides 52 which can be pushed through the openings 40 into the grooves 24 and withdrawn therefrom. One slide 52 per groove 24 is preferably provided. The slides 52 are preferably movable in the radial direction.

In the embodiment shown here, the collecting receptacle 12 is designed as an outer ring, and the ring positioning device 26 is arranged inside the collecting receptacle 12. In another embodiment (not shown), the arrangement is reversed, i.e., the collecting receptacle 12 is arranged on the inside with radial webs 38 which extend radially outwards, and the ring positioning device 26 is guided as an outer ring around the collecting receptacle 12. In this case, the slides 52 can then be inserted radially inwards into the grooves 24.

As seen in FIGS. 4 to 8, to move the slides 52, the ring positioning device 26 has a base body 54, on which the slides 52 are guided in a radially movable manner, and an actuating element 56 which can be moved relative to the base body 54 and is controlled by the controller 30 is movable relative to the base body 54. A conversion gear 58 converts the movement of the actuating element 56 into a radial movement of the slide 52.

The structure of the base body 54, the actuating element 56 and the conversion gear 58 can be designed differently, as long as a relative movement of the actuation element 56 and the base body 54 can be converted into a radial movement of the slide 52. In the illustrated embodiment, the actuating element 56 is a push rod 60, which is movable in the axial direction in the base body 54, which is formed by two ring plates with radial guidance therebetween. A conical flange 62 engages on the push rod 60 and engages in oblique grooves 64 of the slide 52. Instead of this, for example, a cam disk could also be provided for converting the relative movement of the actuating element 56 into the radial movement of the slide 52.

FIGS. 4 and 5 show a state of the ring positioning device 26 with slides 52 retracted inwards. FIGS. 6 and 7 show a state of the ring positioning device 26 with slides 52 extended outwards. In FIG. 8 the externally arranged collecting nest is shown as an example for the collecting receptacle 12, an upper slide guide 66 (for example part of the base body 54), the cone flange 62 as a drive cone for the slide 52, the slide 52 and the lower slide guide 68 (for example, part of the base body 54).

As seen in FIG. 7 and FIGS. 9 and 10, the collecting receptacle 12 has an annular outer contour—ring jacket 36—with webs 38 tapering radially towards the center. In the embodiment shown, there is no ring-shaped inner contour on the collecting receptacle 12 because the slides 52 of the ring positioning device 26 can move radially from the inside to the outside into the groove 24 between the webs 38. As a result, as shown by FIGS. 6 and 7, an "intermediate floor" can be formed.

A single slide 52 is shown in a top view in FIG. 11 and in a perspective view in FIG. 12. The slide 52 has an upwardly directed end face 70, a slide groove 72 for connection to the mechanics and a radially outwardly directed lateral surface 74.

By radially extending the slide 52, the lateral surface 74 moves in the direction of the groove boundary 34 of each groove 24.

The hairpin ends, i.e., the ends of the legs 20a, 20b of the hairpins 18, stand on the end face 70 during the insertion. These end faces 70 serve as a type of "intermediate floor" and are thus an exemplary embodiment of the support device 46.

Through the lateral surface 74, the hairpins 18, in particular their legs 20a, 20b, are positioned radially after they have been received in the ring positioning device 26 and are in particular in the storage position 32. The lateral surfaces 74, the annular jacket 36 and the radial webs 38 form an example of the holding device 48.

The slides 52 can be moved, controlled by the controller 30, into a fully retracted position and into a position for supporting the respective ring which is to be pre-inserted. With a number of n rings (for example n=3 for a first to third ring 14a, 14b, 14c), the slides can thus be moved into n+1 positions.

In the embodiment shown here, with the collecting receptacle 12 arranged on the outside and the ring positioning device 26 arranged on the inside, it is advantageous to first insert an outer ring as the first ring 14a, then to insert a middle ring as the second ring 14b and finally to insert an inner ring as the third ring 14c. To pre-insert the outer ring, the slides 52 are extended radially outward. To pre-insert the central ring, the slides are moved radially outwards, preferably in such a way that they slide against the outer ring, which is located in the storage position 32. To pre-insert the inner ring, the outer ring and the middle ring are in the storage position, and the slides are extended radially outwards, preferably in contact with the middle ring. In order to form the ring arrangement with the three concentric rings 14a, 14b, 14c, the slides 52 are retracted radially inwards, so that the first to third rings 14a-14c align with one another in the storage position 32.

In the following, a formation of a ring arrangement from the first to third ring 14a-14c, starting with the outer ring as the first ring 14a and ending with the inner ring as the third ring 14c, as well as a ring arrangement method for forming such a ring arrangement based on the illustration in FIGS. 2 and 13 to 28 are explained in more detail.

FIG. 13 shows the basic position in which the slides 52 of the ring positioning device 26 are extended maximally radially outwards and thus form the intermediate floor for the ends of the legs 20a, 20b of the hairpins 18 of the first ring 14a. This basic position is also shown in FIG. 8. Slide plates 76, on which the oblique grooves 64 are formed and on which the slide 52 with their slide grooves 72 are seated, have been maximally moved outwards by the conversion gear 58. The push rod 60 is maximally moved upwards.

In this basic position of the ring positioning device 26, the hairpins 18 are picked up individually with the gripping device 28 and, as shown in FIG. 2, inserted into the grooves 24. The already inserted hairpins 18 stand on the end faces 70 with their legs 20a, 20b.

For this purpose, the gripping device 28 is fastened in a handling device, not shown here in particular, such as in particular a robot arm, and grips the respective legs 20a, 20b of the hairpins 18 with a first gripper 78 and a second gripper 80. For this purpose, the grippers 78, 80 are movable relative to one another. All of this is done via the controller 30. For more details of a currently preferred embodiment of the gripping device 28, reference is made to the German patent application DE 10 2019 114 221.0.

FIGS. 14 and 15 show the pre-inserted outer ring—first ring 14a—the ends of the legs 20a, 20b of the hairpins 18 standing on the end faces 70 of the slides 52. For this purpose, the collecting receptacle 12 is shown cut open in FIG. 15.

If the first ring 14a is then completely plugged in, as shown in FIG. 16, the ring positioning device 26 is moved axially downward relative to the collecting receptacle 12. As a result, the hairpins 18 of the first ring 14a-outer ring—are also moved downwards. The first ring 14a also moves downward because the legs 20a, 20b stand on the end faces 70 of the slider 52.

In the storage position 32, as shown in FIG. 17, the hairpins 18 lie with their roof bend 22 on the radial webs 38 of the collecting receptacle 12 when the ring positioning device 26 has been moved downward. Accordingly, the legs 20a, 20b no longer stand on the end faces 70.

The slides 52 are retracted radially inward by moving the actuating element 56 until the retracted position shown in FIG. 19 is reached.

As shown in FIG. 20, the ring positioning device 26 is then moved axially upward relative to the collecting receptacle 12.

Subsequently, as shown in FIG. 21, the slides 52 of the ring positioning device 26 are extended radially outward until they abut the first ring 14a— outer ring. The first ring 14a is positioned in this way.

By positioning the first ring 14a, sufficient space is created to pre-insert the second ring 14b—here, for example, the center ring.

The second ring 14b is then inserted with the first ring located in the storage position 32, as shown in FIG. 3. Here, too, the hairpins 18 of the second ring 14b are individually pre-inserted with the gripping device 28, as is shown for the first ring 14a in FIG. 2.

When the central ring—second ring 14b—has been fully inserted, this central ring is also transferred to the storage position 32 as previously described using the example of the outer ring, and the process sequence begins again for the inner ring—third ring 14c.

In the method explained above, the first ring 14a was moved downwards by actuating the actuator by means of axially relative movement of the ring positioning device 26 with legs 20a, 20b resting on the extended sliders 52.

An alternative procedure for transferring the first ring 14a from the insertion position 16 into the lower storage position 32 is explained below with reference to FIGS. 22 to 24.

FIG. 22 again shows the initial state, wherein the ring positioning device 26 is in the basic position with the slides 52 extended and the first ring 14a has been pre-inserted in the insertion position 16, the legs 20a, 20b standing on the end faces of the extended sliders 52.

The actuating element 56 is then moved, as shown in FIG. 23; the slides 52 are retracted. The first ring 14a falls down by gravity until the hairpins 18 rest on the webs 38. The first ring 14a is thus in the storage position 32.

The slides 52 of the ring positioning device 26 are then extended radially outward until they rest on the first ring 14a. This positions the first ring 14a and creates sufficient space for the second ring 14b to be pre-inserted. Then the second ring 14b is pre-inserted, the legs 20a, 20b of its hairpins 18 resting on the end faces 70 of the slides 52. The slides 52 are then retracted again in order to then transfer the finished second ring 14b into the storage position 32 by gravity and dropping it.

In a further embodiment, which is not shown here, the collecting receptacle is divided, for example, along a horizontal plane into an upper collecting receptacle part and a lower collecting receptacle part, which can be moved axially relative to one another by an actuator. The collecting receptacles can be designed in a corresponding ring. The upper collecting receptacle part can, for example, be moved upwards in a position comparable to FIGS. 14 and 15 until the hairpins 18 rest on the webs 38, while the lower collecting receptacle part and the ring positioning device 26 remain in place. The slides 52 are then retracted. The hairpins 18 are held by the upper collecting receptacle part. The upper collecting receptacle part is moved down relative to the lower collecting receptacle part and the ring positioning device 26, whereby the first ring 14a is gently transferred into the storage position 32. The slides 52 of the ring positioning device 26 are then extended radially outward until they rest on the first ring 14a. This positions the first ring 14a and creates sufficient space for the second ring 14b to be pre-inserted. Then the second ring 14b is pre-inserted, the legs 20a, 20b of its hairpins 18 resting on the end faces 70 of the slides 52. Then the upper collection receptacle part is raised again until the hairpins 18 of the second ring 14b also rest on the webs 38. The two rings 14a and 14b are then transferred to the storage position 32 by retracting the upper collecting receptacle part to insert the third ring 14c.

In a preferred embodiment, pre-insertion in this configuration therefore has the following steps:
1. Pre-insert the outer ring—first ring 14a
2. Raise the upper part of the collecting receptacle, retract slider 52 radially inwards
3. Lower the upper part of the collecting receptacle, slide out slider 52 radially outwards
4. Pre-insert the middle ring—second ring 14b
5. Lift the upper part of the collecting receptacle, retract the slide radially inwards
6. Lower the upper part of the receptacle, extend the radial slide radially outwards
7. Pre-insert the inner ring—third ring 14c
8. Lift the upper part of the collecting receptacle, extend the radial slide radially outwards
9. Lower the upper part of the collecting receptacle, lifting possible with joining device In all of the above-described procedures, after the first to third rings 14a-14c have been inserted, the situation illustrated in FIG. 25 results, where all the rings 14a-14c are in the storage position 32 and rest on the webs 38 of the collecting receptacle 12.

The ring arrangement 82 thus formed is preferably lifted out using the joining device known from [1] or [2]. For this purpose, it is advantageous if the ring assembly 82 protrudes from the collecting receptacle 12, i.e., if all the rings 14a, 14b, 14c are in the concentric position at the insertion position 16.

For this purpose, from the position shown in FIG. 25, the ring positioning device 26 is moved axially downward relative to the collecting receptacle 12 until the slides 52 are located below the legs 20a, 20b. The slides 52 are then extended, as shown in FIG. 27, and then the ring positioning device 26 is again moved axially upward relative to the collecting receptacle 12. The legs 20a, 20b of all hairpins 18 of the ring arrangement 82—first to third ring 14a-14c-then stand on the end faces 70 of the slides 52. Subsequently, as shown in FIG. 28, the ring arrangement 82 is moved upwards by relative axial displacement of the ring positioning device 26 with respect to the collecting receptacle 12. In the position shown in FIG. 28, the ring arrangement 82 can then be removed and inserted into the stator housing by the joining device, which is not shown here but is known from [1] and [2].

LIST OF REFERENCE SIGNS 10 ring arrangement device
12 collecting receptacle
14a first ring
14b second ring
14c third ring
16 axial insertion position
18 hairpin
20a first leg
20b second leg
22 roof bend
24 groove
26 ring positioning device
28 gripping device 30 control
32 storage position
34 groove limitation
36 ring jacket
38 radial web
40 opening
42 radial projection
44 ring flange
46 support device
48 holding device
50 delivery unit
52 slider
54 basic body
56 actuating element
58 conversion gear
60 push rod
62 cone flange
64 oblique groove
66 upper slide guide
68 lower slide guide
70 end face
72 slide groove
74 lateral surface
76 slide plate
78 first gripper
80 second gripper
82 ring arrangement

The invention claimed is:

1. A ring arrangement device (10) for forming a ring arrangement (82) from a plurality of concentrically arranged first, second and third rings (14a, 14b, 14c) of preferably U-shaped electrical conductors, in order to form a coil winding of a component of an electrical machine, comprising
a collecting receptacle (12) with a plurality of grooves (24) arranged in a ring around an axis and delimited by radial webs (38) and a ring positioning device (26) for the relative axial positioning of one or more of the rings (14a, 14b, 14c),
wherein the ring positioning device (26) has a support device (46) for supporting electrical conductors of the ring (14a, 14b, 14c) to be inserted in an axial insertion position (16), in which the conductors protrude further from the collecting receptacle (12), and a holding device (48) for holding the conductors of the completely inserted first ring (14a) in a storage position (32), in which the conductors of the completely inserted first ring (14a) are moved further into the collecting receptacle (12), and said support device (46) is further designed to support the conductors of the second ring (14b) to be inserted with the support device (46), while the holding device (48) holds the conductors of the fully inserted first ring (14a) in the storage position (32),
wherein the grooves (24) of the collecting receptacle (12) each have a groove boundary (34) extending in the circumferential direction on a first radial side and each have an opening (40) on a second radial side,
wherein that ring positioning device (26) has radially or axially movable ring positioning slides (52) which engage in the opening (40) and on which the support device (46) and the holding device (48) are formed, and
wherein the openings (40) of the grooves (24) are formed on an inner radial side and that a ring positioning slide movement device for radially or axially moving the ring positioning slide can be arranged radially within the collecting receptacle (12).

2. The ring arrangement device (10) according to claim 1, wherein the groove boundary (34) is formed on the radial webs or on an annular region of the collecting receptacle (12) or
wherein the support device (46) has stops for the conductors formed on an end face (70) of the individual ring positioning slides extending transversely to the axis, or that the holding device (48) has a lateral surface (74) that can be moved against the groove boundary (34) on the individual ring positioning slides, so that the conductors can be positioned between the lateral surface (74) and the groove boundary (34).

3. The ring arrangement device (10) according to claim 1, wherein the storage position (32) is a stop position at which U-shaped conductors strike with a U-shaped end on the collecting receptacle (12) and can thereby be positioned.

4. The ring arrangement device (10) according to claim 1, wherein a gripping device (28) is provided for gripping and inserting the conductors into one of the first, second or third rings (14a, 14b, 14c) and a controller (30) configured to control the ring positioning device (26) fastened to an axial actuator and the gripping device (28) fastened to a handling device.

5. Ring arranging device (10) The ring arrangement device (10) according to claim 4,
wherein the controller (30) is designed to control the gripping device (28) and the ring positioning device (26) for:
inserting electrical conductors into the grooves (24) of the collecting receptacle (12) at the axial plug-in position (16), at which the conductors protrude axially from the collecting receptacle (12) to form the first ring (14a), axially displacing the first ring (14a) from the axial insertion position (16) further into the collecting receptacle (12) into the storage position (32),
inserting electrical conductors into the grooves (24) of the collecting receptacle (12) at the axial insertion position (16) to form the second ring (14b) while the first ring (14a) is held at the storage position (32) and axially moving the second ring (14b) into the storage position (32).

6. The ring arrangement device (10) according to claim 5 further configured to, while inserting the first, second and third rings (14a, 14b and 14c):
a) pre-inserting the first ring 14a,
b) raising an upper part of the collecting receptacle (12), retracting the ring positioning slides (52) radially inwards,
c) lowering the upper part of the collecting receptacle (12), sliding out the ring positioning slides (52) radially outwards,
d) pre-inserting the second ring (14b),
e) lifting the upper part of the collecting receptacle (12), retracting the ring positioning slides (52) radially inwards,
f) lowering the upper part of the receptacle (12), extending the radial slides (52) radially outwards,
g) pre-inserting the third ring (14c),
h) lifting the upper part of the collecting receptacle (12), extending the radial slides (52) radially outwards, and
i) lowering the upper part of the collecting receptacle (12), lifting with joining device.

* * * * *